(12) United States Patent
Dusan et al.

(10) Patent No.: US 10,313,782 B2
(45) Date of Patent: Jun. 4, 2019

(54) AUTOMATIC SPEECH RECOGNITION TRIGGERING SYSTEM

(71) Applicant: Apple Inc., Cupertino, CA (US)

(72) Inventors: Sorin V. Dusan, San Jose, CA (US); Aram M. Lindahl, Menlo Park, CA (US); Robert D. Watson, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/587,325

(22) Filed: May 4, 2017

(65) Prior Publication Data

US 2018/0324518 A1    Nov. 8, 2018

(51) Int. Cl.
| | |
|---|---|
| G10L 15/24 | (2013.01) |
| H04R 1/10 | (2006.01) |
| G10L 25/06 | (2013.01) |
| G10L 15/08 | (2006.01) |
| G10L 25/78 | (2013.01) |
| G10L 15/22 | (2006.01) |

(52) U.S. Cl.
CPC ............ *H04R 1/1091* (2013.01); *G10L 15/08* (2013.01); *G10L 25/06* (2013.01); *G10L 25/78* (2013.01); *G10L 15/22* (2013.01); *G10L 2015/088* (2013.01); *H04R 2460/13* (2013.01)

(58) Field of Classification Search
CPC ......... G10L 15/02; G10L 15/22; G10L 25/06; G10L 25/21; G10L 2015/025; G10L 2015/223; G10L 25/78; H04R 2460/13
USPC ...................................... 381/110, 91–92, 74
See application file for complete search history.

(56) References Cited

U.S. PATENT DOCUMENTS

| | | | |
|---|---|---|---|
| 7,478,043 B1* | 1/2009 | Preuss | G10L 15/20 704/231 |
| 8,494,507 B1 | 7/2013 | Tedesco et al. | |
| 9,361,885 B2 | 6/2016 | Ganong, III et al. | |
| 9,930,445 B2* | 3/2018 | Zhao | H04R 1/46 |
| 2009/0245532 A1 | 10/2009 | Hupkes et al. | |
| 2012/0278074 A1 | 11/2012 | Burke et al. | |

(Continued)

FOREIGN PATENT DOCUMENTS

EP       2277301 A1     4/2009

OTHER PUBLICATIONS

Tatsuya Hirahara et al., "Acoustic Characteristics of Non-Audible Murmur", JCA 2007, The Japan-China Joint Conference of Acoustics, Jun. 4-6, 2007, 6 pages.

*Primary Examiner* — Disler Paul
(74) *Attorney, Agent, or Firm* — Womble Bond Dickinson (US) LLP

(57) ABSTRACT

An automatic speech recognition (ASR) triggering system, and a method of providing an ASR trigger signal, is described. The ASR triggering system can include a microphone to generate an acoustic signal representing an acoustic vibration and an accelerometer worn in an ear canal of a user to generate a non-acoustic signal representing a bone conduction vibration. A processor of the ASR triggering system can receive an acoustic trigger signal based on the acoustic signal and a non-acoustic trigger signal based on the non-acoustic signal, and combine the trigger signals to gate an ASR trigger signal. For example, the ASR trigger signal may be provided to an ASR server only when the trigger signals are simultaneously asserted. Other embodiments are also described and claimed.

19 Claims, 13 Drawing Sheets

(56) References Cited

U.S. PATENT DOCUMENTS

| | | | |
|---|---|---|---|
| 2012/0284022 A1* | 11/2012 | Konchitsky | G10L 15/24 704/231 |
| 2013/0262116 A1* | 10/2013 | Ben-Ezra | G10L 15/04 704/254 |
| 2014/0270231 A1* | 9/2014 | Dusan | G10L 25/90 381/74 |
| 2014/0330557 A1 | 11/2014 | Huber et al. | |
| 2014/0364967 A1 | 12/2014 | Sullivan | |
| 2015/0161998 A1* | 6/2015 | Park | G10L 15/24 704/231 |
| 2015/0179189 A1 | 6/2015 | Dadu et al. | |
| 2016/0134956 A1* | 5/2016 | Tan | H04R 3/005 381/110 |
| 2016/0250490 A1 | 9/2016 | Hoffman et al. | |
| 2017/0220786 A1* | 8/2017 | Guo | G06F 21/30 |

* cited by examiner

| EVENT | ACOUSTIC TRIGGER SIGNAL 212 | NON-ACOUSTIC TRIGGER SIGNAL 224 | COMBO (ASR TRIGGER SIGNAL) 302 |
|---|---|---|---|
| SILENT | 0 | 0 | 0 |
| BYSTANDER TALKS, USER SILENT | 1 | 0 | 0 |
| USER SPEAKS SIMILAR PHRASE | 0 | 1 | 0 |
| USER SPEAKS KEY PHRASE | 1 | 1 | 1 |

AUTOMATIC SPEECH RECOGNITION TRIGGERING SYSTEM

BACKGROUND

Field

Embodiments related to speech recognition systems, such as hands-free computer systems, are disclosed. More particularly, embodiments related to computer systems having intelligent personal assistant agents, are disclosed.

Background Information

Computer systems and mobile devices can utilize intelligent personal assistant software agents, such as voice assistants. Voice assistants can be triggered by an always-on-processor (AOP) based on voice data generated by a microphone. For example, the AOP may recognize a key-phrase represented by the voice data, and generate a trigger signal to activate speech recognition of a payload of the voice data. Trigger signals to activate a speech recognition algorithm can also be generated in response to physical taps by a user on an accessory of the computer system.

SUMMARY

Speech recognition triggers that are based on verbal commands or physical taps as inputs may not function seamlessly in noisy environments and/or are subject to false triggers. For example, key-phrases spoken by a bystander can falsely trigger the voice assistant. Similarly, unintentional taps on the accessory of the computer system can generate false triggers. False triggers can drain device power and frustrate the user.

An automatic speech recognition (ASR) triggering system can generate an ASR trigger based in part on a non-acoustic signal generated by an accelerometer. In an embodiment, the ASR triggering system may include a microphone to generate an acoustic signal representing an acoustic vibration, and an accelerometer to generate a non-acoustic signal representing a bone conduction vibration. An acoustic detector may receive the acoustic signal from the microphone and generate an acoustic trigger signal based on the acoustic signal. Similarly, a voice activity detector (VAD) may receive the non-acoustic signal from the accelerometer and generate a VAD signal based on energy or a cross-correlation value. The cross-correlation value may be based on cross-correlation of several accelerometer axis signal components of the non-acoustic signal. The cross-correlation value may be based on cross-correlation of the acoustic signal and the non-acoustic signal. A processor of the ASR triggering system may receive the acoustic trigger signal and a non-acoustic trigger signal, which is based on the energy or cross-correlation value. The processor can generate an ASR trigger signal based on a combination of the acoustic trigger signal and the non-acoustic trigger signal. The combination may include a logical operation, e.g., an AND gate using binary trigger input signals to generate a binary ASR trigger output signal.

In an embodiment, an ASR triggering system includes a microphone to generate an acoustic signal representing an acoustic vibration, and an accelerometer to generate a non-acoustic signal representing a bone conduction vibration. A multi-channel key-phrase detector can receive the acoustic signal and the non-acoustic signal on different channels. For example, a processor includes an acoustic channel to receive the acoustic signal and a non-acoustic channel to receive the non-acoustic signal. The processor can generate an ASR trigger signal based on a combination of the acoustic signal and the non-acoustic signal. For example, the processor can generate the ASR trigger signal when the acoustic signal and the non-acoustic signal coincide for a predetermined key-phrase signal. The acoustic signal may have a higher energy bandwidth than the non-acoustic signal, e.g., the acoustic signal may have an energy bandwidth of several kHz and the non-acoustic signal may have an energy bandwidth less than 1 kHz. The processor may generate the ASR trigger signal as a binary output.

In an embodiment, an ASR triggering system includes an accelerometer to generate a non-acoustic signal corresponding to an input command pattern made by a user. For example, the user may make a series of hums having a monotone audio characteristic as a predetermined trigger cue. A processor may receive the non-acoustic signal and generate an ASR trigger signal based on the non-acoustic hum pattern signal. For example, the processor may perform a state machine function that sequentially compares the non-acoustic signal and a predetermined sequence of energy intervals to advance from an initial state through one or more intermediate states to a final state. The ASR trigger signal can be generated by the processor in response to reaching the final state. For example, when an energy peak of the non-acoustic signal matches an energy interval corresponding to the final state in the input command pattern, the processor may generate the ASR trigger signal as a binary output.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

DETAILED DESCRIPTION

Figure 1:
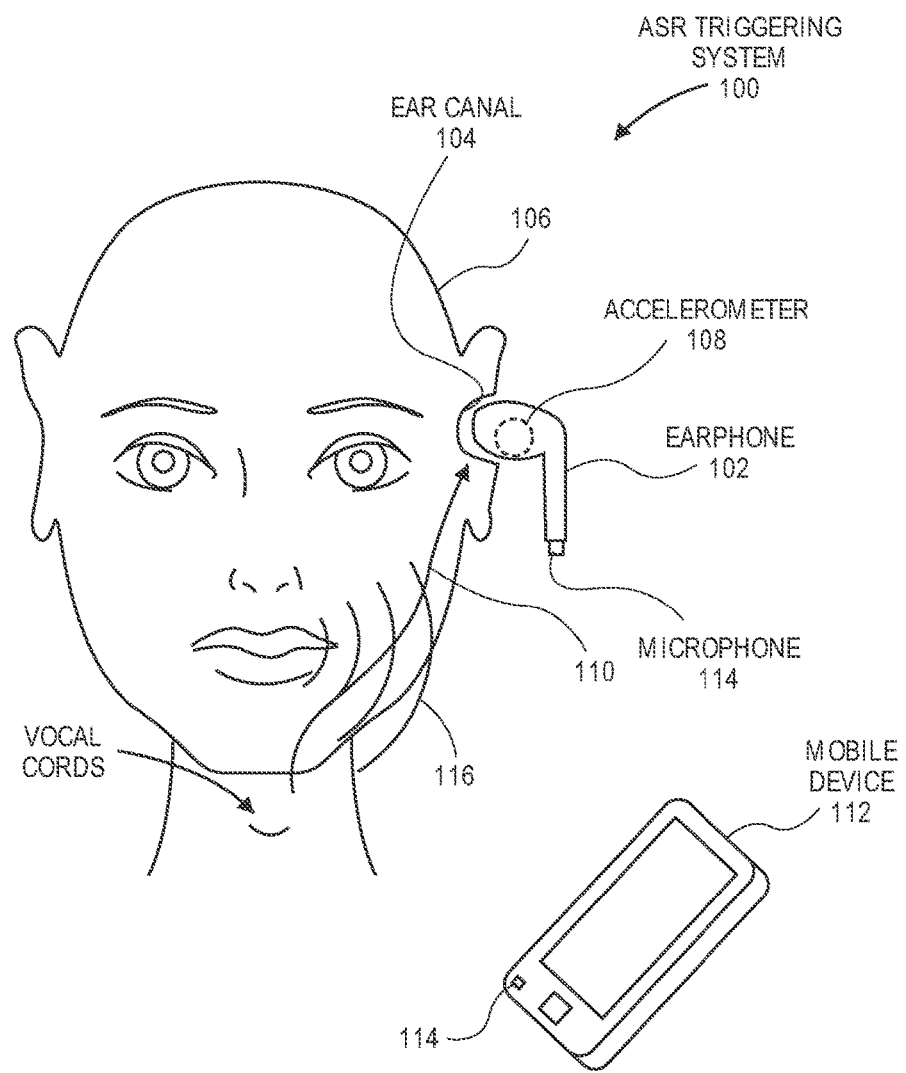
FIG. 1 is a pictorial view of an automatic speech recognition (ASR) system having an earphone worn in an ear canal of a user, in accordance with an embodiment.

Embodiments describe automatic speech recognition (ASR) triggering systems, and methods of providing an ASR trigger. The ASR triggering system may include an accelerometer mounted in an ear canal of a user, and a computer system, such as a desktop computer, laptop computer, a tablet computer, a mobile device, or a wearable computer. The ASR triggering system may also include an accelerometer mounted on headphones, frames of eyeglasses, helmets or neckbands. The ASR triggering system may, however, be incorporated into other applications, such as a medical device, a motor vehicle, or an aircraft, to name only a few possible applications.

In various embodiments, description is made with reference to the figures. However, certain embodiments may be practiced without one or more of these specific details, or in combination with other known methods and configurations. In the following description, numerous specific details are set forth, such as specific configurations, dimensions, and processes, in order to provide a thorough understanding of the embodiments. In other instances, well-known processes and manufacturing techniques have not been described in particular detail in order to not unnecessarily obscure the description. Reference throughout this specification to "one embodiment," "an embodiment," or the like, means that a particular feature, structure, configuration, or characteristic described is included in at least one embodiment. Thus, the appearance of the phrase "one embodiment," "an embodiment," or the like, in various places throughout this specification are not necessarily referring to the same embodiment. Furthermore, the particular features, structures, configurations, or characteristics may be combined in any suitable manner in one or more embodiments.

The use of relative terms throughout the description may denote a relative position or direction. For example, "over" may indicate a first direction away from a reference point. Similarly, "under" may indicate a location in a second direction orthogonal to the first direction. Such terms are provided to establish relative frames of reference, however, and are not intended to limit the use or orientation of an ASR triggering system to a specific configuration described in the various embodiments below.

In an aspect, an ASR triggering system and a method of generating an ASR trigger signal uses non-acoustic data generated by an accelerometer in an earphone or headset. A wired or wireless (e.g., Bluetooth-enabled) headset can include an embedded accelerometer that is mounted in an ear canal of a user or on a head of a user. The ASR triggering system includes a processor to receive a non-acoustic trigger signal based on a non-acoustic signal generated by the accelerometer, e.g., accelerometer data representing mechanical vibrations transmitted to the headset via bone conduction when the user speaks or hums. The processor can also receive an acoustic trigger signal, based on an acoustic signal generated by a microphone of the ASR triggering system, e.g., microphone data representing acoustic vibrations of the sound from the user speaking or humming. The processor can generate an ASR trigger signal based on a comparison of the non-acoustic trigger signal and/or the acoustic trigger signal. More particularly, the processor can detect simultaneous acoustic and non-acoustic vibrations generated during speech utterances to determine that the user is actually the source of a key-phrase, and therefore, to prevent false triggers of an ASR function.

In an aspect, an ASR triggering system provides an alternative to tapping an earbud to trigger a voice assistant. The ASR triggering system can include a processor to receive a non-acoustic signal generated by an accelerometer. The non-acoustic signal can represent an input command pattern by the user. For example, the user may produce a predetermined sequence of hums or speak a predetermined sequence of phonemes to trigger the voice assistant. The hums or speech may be detected by an accelerometer, and the accelerometer may generate a corresponding non-acoustic signal. The processor may compare the non-acoustic signal to a predetermined sequence of energy intervals to determine that the user is triggering the voice assistant. When the non-acoustic signal is generated by the accelerometer mounted in an ear canal of the user, it is known that the user is actually the source of the trigger, and therefore, false triggers are prevented.

Referring to FIG. 1, a pictorial view of an automatic speech recognition (ASR) system having an earphone worn in an ear canal of a user is shown in accordance with an embodiment. An ASR triggering system 100 may include a headset having an earphone 102. Earphone 102 may be configured to be worn in an ear canal 104 of a user 106. For example, earphone 102 may be an earbud. In an embodiment, earphone 102 includes an electrical vibration sensing element. The vibration sensing element may be an inertial sensor, such as an accelerometer 108. Accelerometer 108 may be integrated into a housing of earphone 102.

Accelerometer 108 may be sensitive to mechanical vibrations, i.e., non-acoustic vibrations 110, transmitted to ear canal 104. More particularly, accelerometer 108 may measure acceleration of a proof mass (not shown) and output an electrical signal that is representative of the acceleration. Accelerometer 108 may detect acceleration of the proof mass along several axes. Thus, the electrical signal output by accelerometer 108 may include a first electrical signal representing acceleration of the proof mass along a first axis and a second electrical signal representing acceleration of the proof mass along a second axis. Accordingly, vibrations transmitted to ear canal 104 may be detected by earphone 102, and the electrical signal representing the detected non-acoustic vibrations 110 may be communicated as an analog electrical signal or a digital electrical signal to a processor, e.g., in a mobile device 112, through either a wired or a wireless connection.

In an embodiment, non-acoustic vibrations 110 detected by accelerometer 108 in ear canal 104 are transmitted to earphone 102 from vocal cords of user 106 via bone conduction. For example, when user 106 speaks or makes a hum, vibrations from the speech or humming resonate through the skull of user 106. The vibrations, i.e., bone conduction vibrations, may be thus transmitted from the vocal cords of user 106 to ear canal 104, and through an ear canal 104 wall, to the earphone housing and accelerometer 108.

In an embodiment, ASR triggering system 100 may further include a microphone 114 to receive acoustic vibrations 116 emitted by the mouth and nostrils of user 106. For example, when user 106 speaks or hums, sound may travel through the air from the mouth and nostrils to microphone 114 of ASR triggering system 100. Microphone 114 may be mounted in the headset 102, or in mobile device 112. For example, the headset may be worn by user 106 with microphone 114 located near user's mouth such that the voice is input to the microphone 114 for subsequent conversion into an electrical acoustic signal. More particularly, microphone 114 can generate an acoustic signal representing acoustic vibrations 116 produced by the mouth and nostrils of user 106 during speech or humming. The electrical voice signal may be further processed to provide a voice-centric application, such as telephony of mobile device 112, or used in speech recognition functionality of ASR triggering system 100 or an ASR server.

ASR triggering system 100 can be communicatively coupled to a primary ASR server (not shown) that performs speech recognition functions on words spoken by user 106. For example, the primary ASR server may be located remotely and communicatively coupled to mobile device 112 to receive a payload of voice data generated by microphone 114 in response to user's speech. Alternatively, the primary ASR server may be located on mobile device 112 to process the payload of voice data locally. Accordingly, ASR triggering system 100 may detect acoustic and/or non-acoustic input commands by user 106 and provide a trigger signal to the primary ASR system. The primary ASR server, in response to the trigger signal, may perform speech recognition functions on voice data received directly from microphone 114 or via a communication link with mobile device 112.

In an embodiment, ASR triggering system 100 enhances microphone-based key-phrase detectors, e.g., always-on-processor (AOPs), by employing an accelerometer-mic voice activity detector (VAD). The VAD can detect energy of, or determine a cross-correlation value for, accelerometer and/or microphone signals to generate a VAD signal representing a detection of simultaneous acoustic and non-acoustic activity. The VAD signal may be processed further and/or combined with an output of a low-power AOP used for key-phrase detection to gate a trigger signal of a voice assistant. That is, the trigger signal may initiate the primary ASR server only when there is simultaneous detection of acoustic and non-acoustic voice activity. Accordingly, false triggers from the AOP key-phrase detector may be prevented, e.g., when bystanders speak the key-phrase within range of microphone 114.

Figures 2, 3:
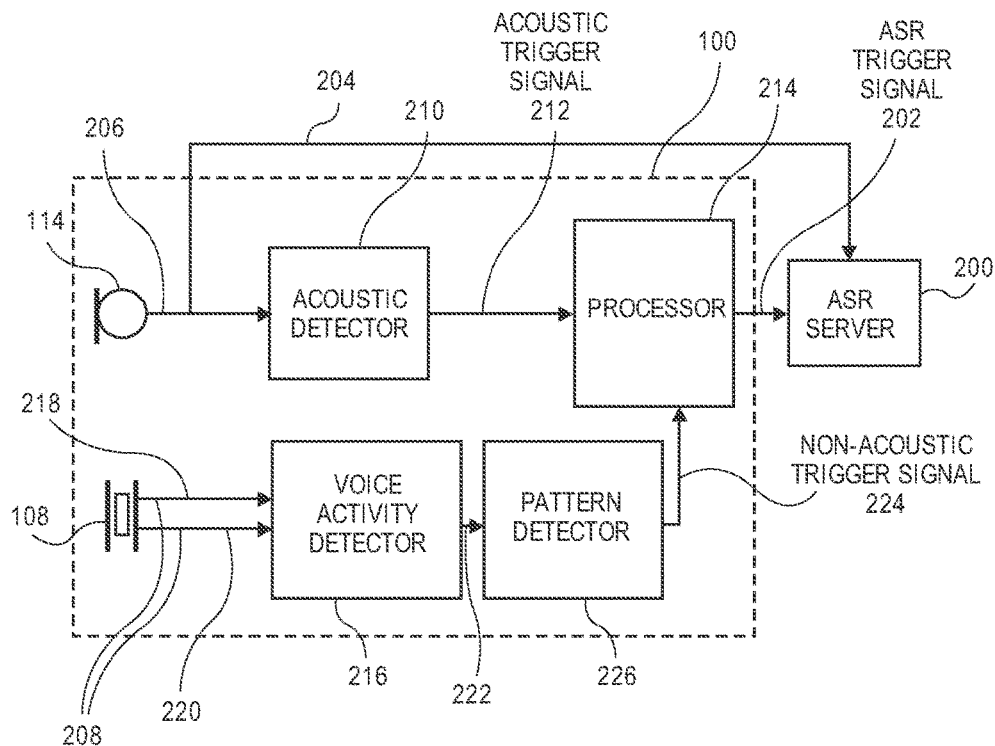
FIG. 2 is a block diagram of an ASR system having a voice activity detector to generate a non-acoustic trigger signal based on accelerometer data, in accordance with an embodiment.
FIG. 3 is a table representing a combination of acoustic and non-acoustic triggers signals mapped to respective ASR trigger signals, in accordance with an embodiment.

Referring to FIG. 2, a block diagram of an ASR triggering system having a voice activity detector to generate a non-acoustic trigger signal based on accelerometer data is shown in accordance with an embodiment. ASR triggering system 100 may be coupled to an ASR server 200. The ASR server 200 can also be replaced by an ASR engine running locally on the connected device (e.g., a mobile phone, a tablet, or a computer). ASR triggering system 100 may generate an ASR trigger signal 202 to initiate speech recognition functions at ASR server 200. In an embodiment, the speech recognition functions may be performed on a payload 204 of voice data generated by microphone 114 of ASR triggering system 100. Payload 204 may be sent from the microphone 114 directly to ASR server 200 and stored by ASR server 200. ASR server 200 may initiate speech recognition on payload 204 in response to receiving ASR trigger signal 202 from ASR triggering system 100.

ASR triggering system 100 can use electrical signals from microphone 114 and accelerometer 108 to trigger ASR server 200 in a hands-free mode. Microphone 114 can generate an acoustic signal 206 representing acoustic vibrations 116 from the mouth and nostrils of user 106. The acoustic vibrations 116 may correspond to a voice trigger, i.e., a command from the user 106 to start the automatic speech recognition processes. Similarly, accelerometer 108 can generate non-acoustic signals 208 representing bone conduction vibrations transmitted from the vocal cords through the skull of user 106. Acoustic signal 206 and non-acoustic signal 208 may be sent to one or more detectors of ASR triggering system 100.

ASR triggering system 100 may include an acoustic detector 210 to receive acoustic signal 206 from microphone 114. Acoustic detector 210 may be a key-phrase detector. The key-phrase detector can include circuitry to perform a special case of ASR in which a limited number of words, e.g., one to five words, are recognized. Any other sounds may not register at acoustic detector 210. Thus, acoustic detector 210 may have a much smaller vocabulary than ASR server 200.

In an embodiment, acoustic detector 210 receives acoustic signal 206 and generates an acoustic trigger signal 212 based on acoustic signal 206. For example, when acoustic detector 210 identifies the key-phrase that it is trained to recognize, a binary output may be generated. That is, acoustic trigger signal 212 may be a high digital signal when acoustic signal 206 matches an energy signature of the key-phrase, i.e., a predetermined key-phrase signal, and acoustic trigger signal 212 may be a low digital signal when acoustic signal 206 does not match the predetermined key-phrase signal. The binary acoustic trigger signal 212 may be sent to a processor 214 of ASR triggering system 100. Processor 214 may store acoustic trigger signal 212 to gate the trigger signal based on information received from another detector of ASR triggering system 100.

ASR triggering system 100 may include a voice activity detector (VAD) 216 to receive non-acoustic signal 208. In an embodiment, non-acoustic signal 208 includes an accelerometer signal from accelerometer 108. The accelerometer signal 208 may include several sub-signals that are communicated to VAD 216. For example, accelerometer 108 may detect bone conduction vibration along at least two axes, and non-acoustic signal 208 may include a first axis signal 218 representing vibration along a first axis and a second axis signal 220 representing vibration along a second axis. Non-acoustic signal 208 may be processed by VAD 216 to detect voice activity of the user 106.

In an embodiment, VAD 216 generates a VAD signal 222 based on non-acoustic signal 208. More particularly, VAD 216 may generate VAD signal 222 based on an energy or a cross-correlation of non-acoustic signal 208. For example, VAD 216 may cross-correlate first axis signal 218 and second axis signal 220 to generate a cross-correlation value, and VAD signal 222 may be based on the cross-correlation value. In such cases, VAD signal 222 may be referred to as a cross-correlation signal. Cross-correlation of the sub-signals of non-acoustic signal 208 may provide a more robust and reliable detection of speech. Vibrations generated by speech generally exist along different axes, and thus, by cross-correlating the signals representing the different vibrations it can be determined that non-acoustic signal 208 is actually representative of a voice and not, e.g., oscillations forced by a vehicle that the user is traveling in. It will be appreciated, however, that cross-correlation is not necessary, and in an embodiment, VAD 216 generates an output signal based on the energy in a non-acoustic input signal representing vibrations along a single axis. In such cases, VAD signal 222 may be referred to as a single-axis voice activity signal.

VAD 216 can generate VAD signal 222 as a binary output. That is, VAD signal 222 may be a high digital signal when a cross-correlation value calculated by VAD 216 is higher than a predetermined correlation threshold. For example, the predetermined correlation threshold can be 0.5, indicating that an amplitude of vibrations along the first axis are at least within a 50% difference of an amplitude of vibrations along the second axis. When the calculated cross-correlation value is higher than 0.5 in this example, VAD signal 222 may be output as a high binary output. When the calculated cross-correlation value is lower than 0.5 in this example, VAD signal 222 may be output as a low binary output.

Circuitry of ASR triggering system 100 may generate a non-acoustic trigger signal 224 based on VAD signal 222. For example, non-acoustic trigger signal 224 may be a binary signal based on VAD signal 222. VAD 216 may generate the non-acoustic trigger signal 224 as a high digital signal when VAD signal 222 is a high digital signal, i.e., when the cross-correlation value is above the predetermined correlation threshold. Alternatively, VAD 216 may generate the non-acoustic trigger signal 224 based on an average of VAD signal 222 over time. Thus, during a time frame when the cross-correlation value is mostly above the predetermined correlation threshold, e.g., when the user 106 is speaking, VAD signal 222 and non-acoustic trigger signal 224 may be a high digital signal. Similarly, during a time-frame when the user 106 is not speaking, VAD signal 222 and non-acoustic trigger signal 224 may be a low digital signal. The binary non-acoustic trigger signal 224 may be sent to processor 214 of ASR triggering system 100. Processor 214 may store non-acoustic trigger signal 224 to gate acoustic trigger signal 212 as described below.

Additional processing of VAD signal 222 may be performed by circuitry of ASR triggering system 100 to generate non-acoustic trigger signal 224. In an embodiment, ASR triggering system 100 includes a pattern detector 226 to detect a match between VAD signal 222 and a predetermined sequence of energy intervals. For example, the key-phrase used as a voice trigger may have an energy signature. The energy signature can include periods of high and low energy, e.g., during moments when a word is spoken and moments between words of the key-phrase. This predetermined sequence of energy intervals can be compared to VAD signal 222 by pattern detector 226. When pattern detector 226 determines a match between the key-phrase sequence and VAD signal 222, non-acoustic trigger signal 224 may be generated as a high digital signal and sent to processor 214. Non-acoustic trigger signal 224 may be generated by VAD 216 or pattern detector 226. For example, pattern detector 226 may be integral to VAD 216, and thus, VAD 216 may generate non-acoustic trigger signal 224 in response to the match between VAD signal 222 and the predetermined sequence of energy intervals.

Processor 214 can receive acoustic trigger signal 212 and non-acoustic trigger signal 224. In an embodiment, processor 214 generates ASR trigger signal 202 based on a combination of acoustic trigger signal 212 and non-acoustic trigger signal 224. For example, processor 214 may perform a logical function on the binary inputs of acoustic trigger signal 212 and non-acoustic trigger signal 224 to determine a trigger output.

Referring to FIG. 3, a table representing a combination of acoustic and non-acoustic triggers signals mapped to respective ASR trigger signals is shown in accordance with an embodiment. The table illustrates that acoustic trigger signal 212 and non-acoustic trigger signal 224 may have corresponding high or low digital signals (0 or 1 binary signals) depending on an event. A combination 302 of the trigger signals can be an output of an AND gate implemented by processor 214. The combination 302 may correspond to ASR trigger signal 202 sent by ASR triggering system 100 to the primary ASR server 200, and may be a high or low digital signal. Thus, processor 214 may generate ASR trigger signal 202 (or may output ASR trigger signal 202 as a binary "1" output) when acoustic trigger signal 212 and non-acoustic trigger signal 224 are simultaneously high digital signals. Similarly, when one or more acoustic trigger signal 212 or non-acoustic trigger signal 224 are low digital signals, processor 214 may not generate ASR trigger signal 202 (or may output ASR trigger signal 202 as a binary "0" output).

Exemplary events in which either acoustic trigger signal 212 or non-acoustic trigger signal 224 are low binary signals include moments of silence (acoustic trigger signal 212 low and non-acoustic trigger signal 224 low), moments when a bystander speaks the key-phrase while user 106 is not talking (acoustic trigger signal 212 high and non-acoustic trigger signal 224 low), and moments when user 106 utters a phrase similar to the key-phrase but not exactly the key-phrase (acoustic trigger signal 212 low and non-acoustic trigger signal 224 high). In these events, the primary ASR system is not triggered to begin speech recognition. By contrast, an exemplary event in which both acoustic trigger signal 212 and non-acoustic trigger signal 224 are high binary signals include a moment when user 106 speaks the key-phrase (acoustic trigger signal 212 high and non-acoustic trigger signal 224 high). In this event, the primary ASR server 200 is triggered to begin speech recognition on the payload 204 received from microphone 114.

Processor 214 may perform more complex logical operations or algorithms on acoustic trigger signal 212 and non-acoustic trigger signal 224 to determine whether to generate ASR trigger signal 202. For example, in an embodiment, acoustic trigger signal 212 and non-acoustic trigger signal 224 may include patterns. That is, the trigger signals may be analog signals or may be digital signals having a particular sequence corresponding to a spoken key-phrase. Processor 214 may perform pattern matching on the signatures of the signals or the sequence of the signals to determine whether acoustic trigger signal 212 coincides with non-acoustic trigger signal 224. Coincidence of the trigger signals can indicate that signals from microphone 114 and accelerometer 108 are being asserted similarly and simultaneously, and thus, processor 214 may trigger ASR server 200 to begin speech recognition on payload 204.

ASR triggering system 100 shown in FIG. 2 represents an embodiment of a system to gate or match an output of a key-phrase detector with an output of a VAD and/or a pattern detector. The embodiment is not limiting, however. Other embodiments of ASR triggering system 100 are contemplated. For example, ASR triggering system 100 may include VAD 216 that cross-correlates acoustic data from microphone 114 and non-acoustic data from accelerometer 108 to detect voice activity, as described below with respect to FIG. 4.

Figure 4:
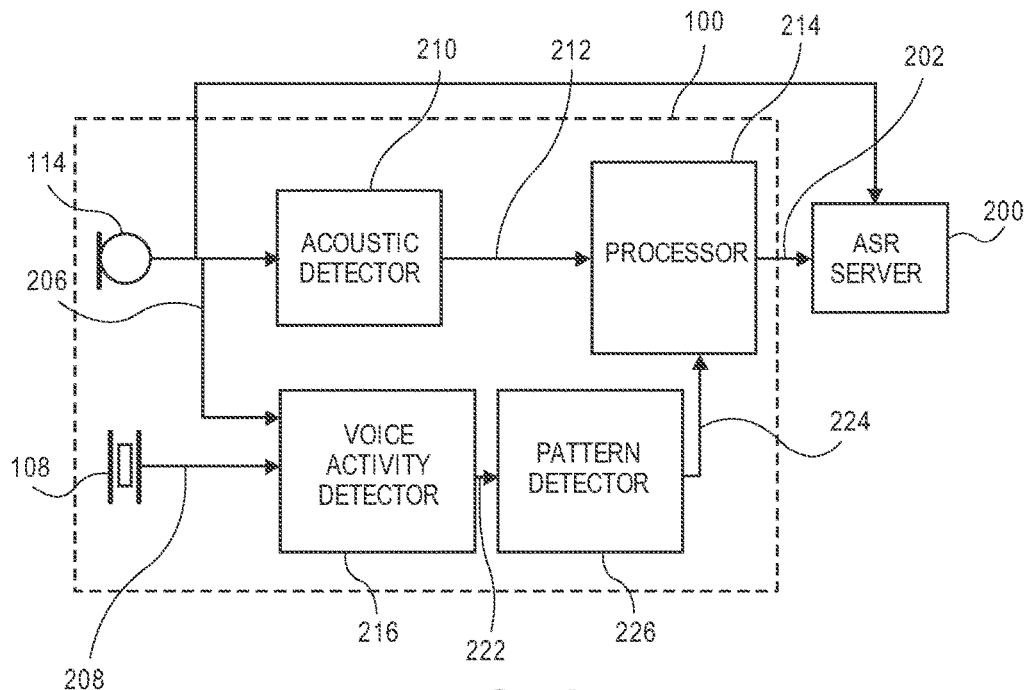
FIG. 4 is a block diagram of an ASR system having a voice activity detector to generate a non-acoustic trigger signal based on microphone and accelerometer data, in accordance with an embodiment.

Referring to FIG. 4, a block diagram of an ASR triggering system having a voice activity detector to generate a non-acoustic trigger signal based on microphone and accelerometer data is shown in accordance with an embodiment. ASR triggering system 100 may include VAD 216 to cross-correlate signals from microphone 114 and accelerometer 108. The cross-correlated acoustic and non-acoustic signals may drive a gating signal used by processor 214 to determine whether to trigger ASR server 200. In an embodiment, VAD 216 receives acoustic signal 206 from microphone 114 and non-acoustic signal 208 from accelerometer 108. VAD 216 can cross-correlate acoustic signal 206 and non-acoustic signal 208 to generate VAD signal 222. VAD signal 222 can be based on the calculated cross-correlation values as described above. Acoustic signal 206 and non-acoustic signal 208 may have different characteristics, e.g., may be scaled differently or may have different energy bandwidths, and thus, the signals may be conditioned as needed to generate the cross-correlation values or VAD signal 222. ASR triggering system 100 can optionally include pattern detector 226 to further process VAD signal 222 as described above. Processor 214 may receive non-acoustic trigger signal 224 based on VAD signal 222 generated by cross-correlation of acoustic and non-acoustic signals. Processor 214 may gate or pattern match acoustic trigger signal 212 received from acoustic detector 210 to generate ASR trigger signal 202 accordingly.

ASR triggering system 100 may include circuitry to save battery power by limiting operation of accelerometer as needed. For example, accelerometer 108 and/or VAD 216 may be in a sleep or off state, and may be awakened to detect non-acoustic vibrations only when microphone 114 senses a partial key-phrase. ASR triggering system 100 incorporating such power-saving configurations are described below with respect to FIGS. 5A-5C.

Figure 5A:
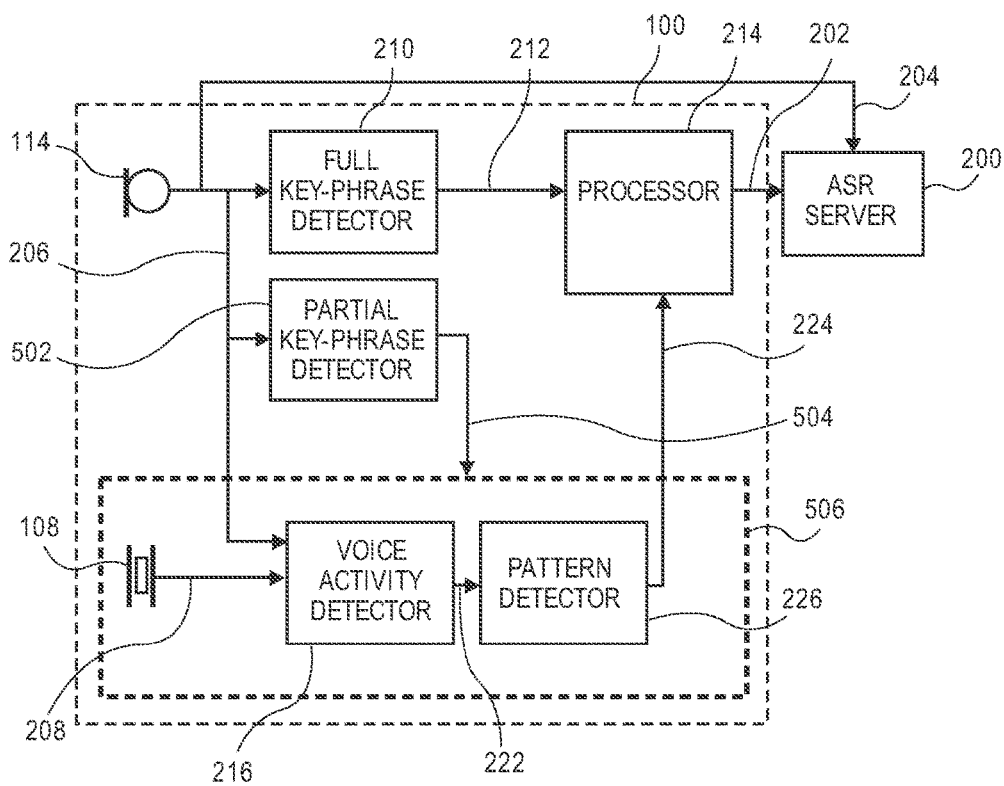
FIGS. 5A-5C are block diagrams of an ASR system having a partial key-phrase detector to power-on a voice activity detector, in accordance with an embodiment.

Referring to FIG. 5A, a block diagram of an ASR triggering system having a partial key-phrase detector to power-on a voice activity detector is shown in accordance with an embodiment. ASR triggering system 100 may include a separate key-phrase detector running to detect a portion of the key-phrase spoken by user. For example, the key-phrase can include several words, and the separate key-phrase detector may detect only a first word or syllable of the key-phrase, and trigger a flag once the first word or syllable is detected. The flag can be used to power-on accelerometer 108 and accelerometer processing, e.g., processing by VAD 216, to begin generating and detecting non-acoustic signal 208 representing the remaining portion of the key-phrase.

In an embodiment, ASR triggering system 100 includes second acoustic detector 502 to receive acoustic signal 206 from microphone 114. Second acoustic detector 502 may perform pattern matching of acoustic signal 206 on a predetermined energy signature. More particularly, the predetermined energy signature may correspond to a partial key-phrase, such as the word "Hey." The partial key-phrase may be referred to as a power-on portion of the key-phrase because the partial phrase is a trigger command to power-on accelerometer 108. Second acoustic detector 502 may generate a power-on signal 504 in response to detecting the power-on portion of the predetermined key-phrase signal. ASR triggering system 100 may include an accelerometer subsystem 506 including accelerometer 108, VAD 216, and optionally, pattern detector 226. Accelerometer subsystem 506 may receive power-on signal 504 and accelerometer 108 may turn on in response to the signal. Accelerometer 108 can be powered on nearly instantaneously, e.g., within 10-20 ms, and non-acoustic signal 208 can be generated by accelerometer 108 in response to receiving power-on signal 504 from second acoustic detector 502.

VAD 216 may cross-correlate acoustic signal 206 and/or non-acoustic signal 208 to generate VAD signal 222 and ultimately non-acoustic trigger signal 224 based on the remaining portion of the key-phrase. Processor 214 may receive non-acoustic trigger signal 224 and acoustic trigger signal 212 to generate ASR trigger signal 202 as described above. Thus, processor 214 may gate key-phrase detection of an entire key phrase performed by acoustic detector 210 with a partial phrase detection performed by accelerometer subsystem 506. The partial phrase detection can be performed when accelerometer subsystem 506 is awakened by second acoustic detector 502. Battery power may be saved because the gating signal may not be provided by accelerometer subsystem 506 all the time, but rather, accelerometer subsystem 506 may be turned on only when needed for key-phrase confirmation.

Figure 5B:
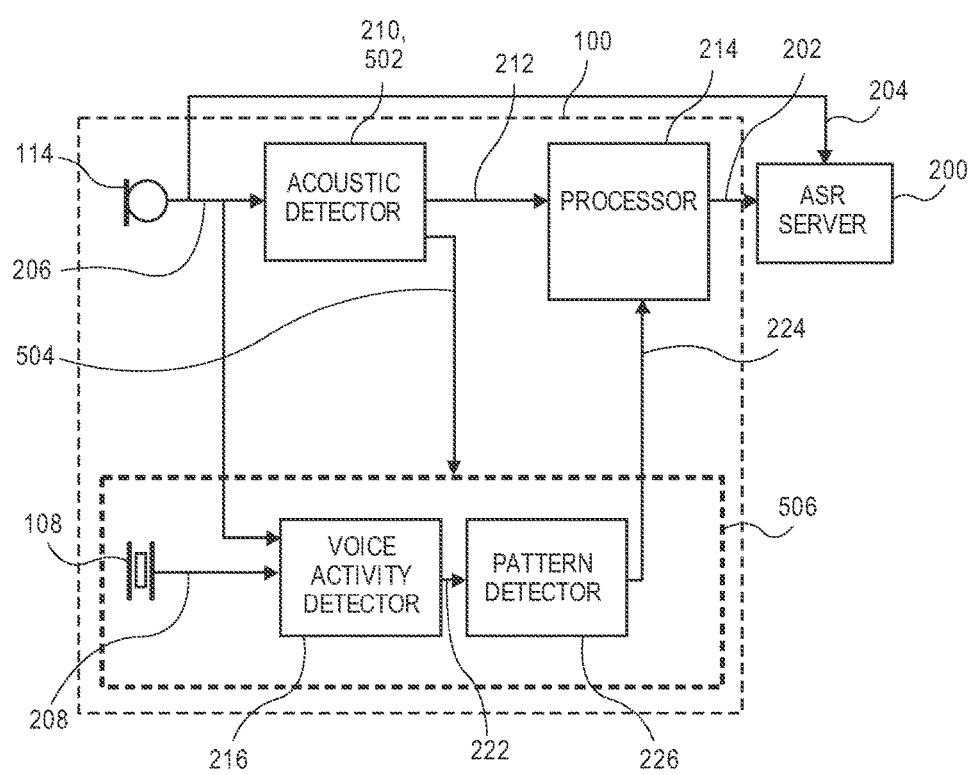

Referring to FIG. 5B, a block diagram of an ASR triggering system 100 having a partial key-phrase detector to power-on a voice activity detector is shown in accordance with an embodiment. In an embodiment, acoustic detector 210 and second acoustic detector 502, which are shown as being separate in FIG. 5A, are integrated into a single key-phrase detector. The key-phrase detector can receive acoustic signal 206 from microphone 114 and perform partial and full phrase detection on the received voice data. The key-phrase detector can output acoustic trigger signal 212 based on the full phrase detection. The key-phrase detector can output power-on signal 504 based on the partial phrase detection. Power-on signal 504 can activate accelerometer subsystem 506 to process acoustic and/or non-acoustic signals 208 to generate non-acoustic trigger signal 224 as described above.

Figure 5C:
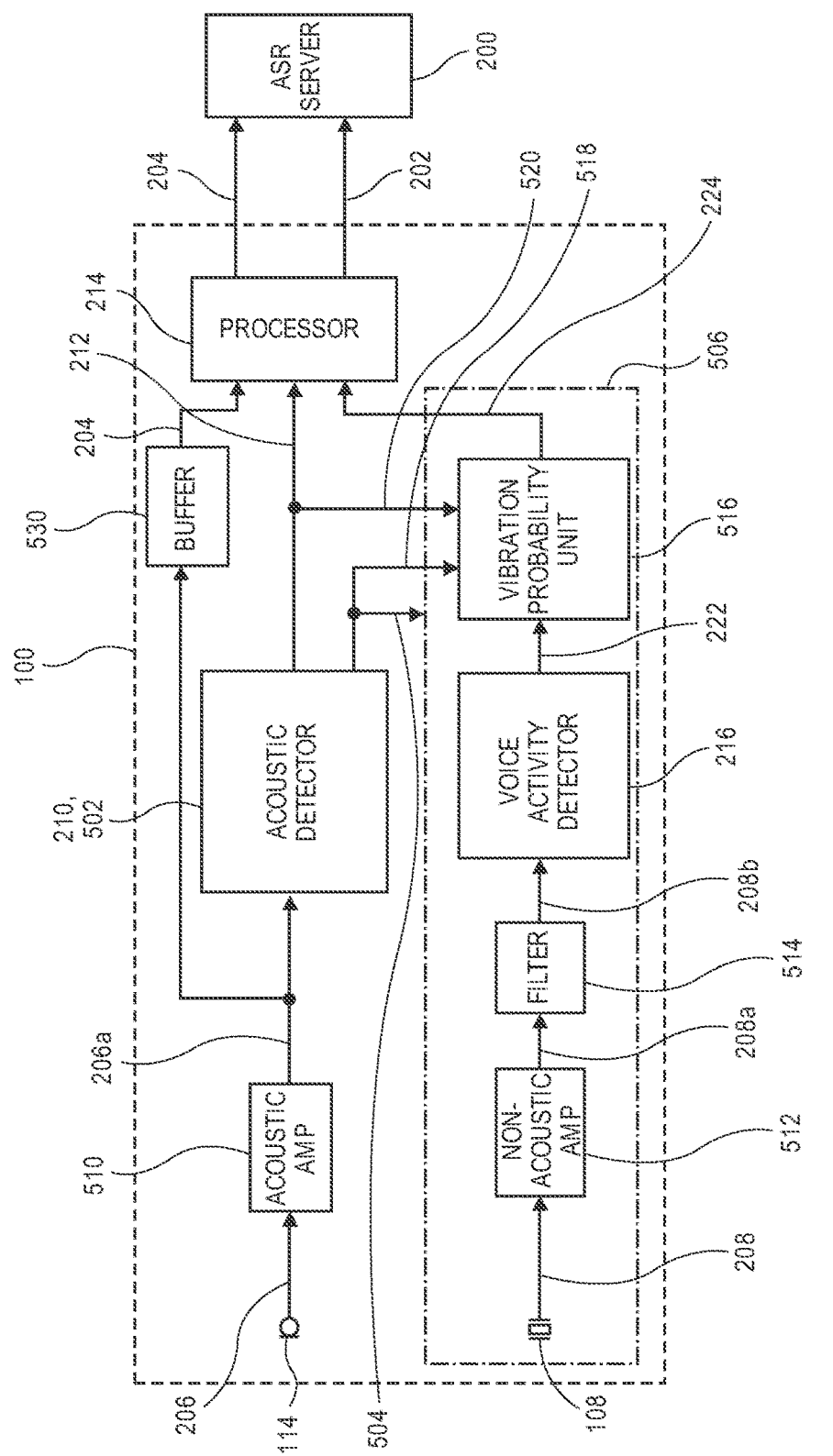

Referring to FIG. 5C, a block diagram of an ASR triggering system 100 having a partial key-phrase detector to power-on a voice activity detector is shown in accordance with an embodiment. ASR triggering system 100 includes several components that may be incorporated into any of the other device configurations described herein. For example, signal conditioning components may be incorporated in ASR triggering system 100. In an embodiment, acoustic signal 206 generated by microphone 114 or non-acoustic signal 208 generated by accelerometer 108 may be processed prior to receipt by a respective detector. Acoustic signal 206 may be passed through an acoustic amplifier 510 to generate acoustic signal 206*a* having a gain, e.g., of 20 dB, as compared to acoustic signal 206. Similarly, non-acoustic signal 208 may be passed through a non-acoustic amplifier 512 to generate a non-acoustic signal 208*a* having a gain as compared to non-acoustic signal 208. Additional signal conditioning can include filtering acoustic signal 206 or non-acoustic signal 208. For example, non-acoustic signal 208*a* can be passed through a filter 514 to generate non-acoustic signal 208*b* having filtered frequencies as compared to non-acoustic signal 208*a*. Filter 514 may be a high-pass filter or a band-pass filter, to pass a predetermined range of frequencies and reject other frequencies. Accordingly, acoustic detector 210 and VAD 216 may receive raw signals or conditioned signals from respective transducer components in any of the embodiments described herein.

As described above, acoustic detector 210 can include one or more key-phrase detectors, e.g., a full key-phrase detector and a partial key-phrase detector to generate signals in response to acoustic signal 206 (or 206a). When acoustic detector 210 detects a partial key-phrase utterance, power-on signal 504 can be generated to initiate accelerometer subsystem 506. Accelerometer subsystem 506 may begin generating accelerometer data and processing the accelerometer data. For example, VAD 216 can receive non-acoustic signal 208b and process the signal to determine whether the user is the source of acoustic signal 206a received by acoustic detector 210.

In an embodiment, VAD 216 generates a voice activity signal based on non-acoustic signal 208b. VAD 216 can calculate VAD signal 222 as a binary output over a series of frames based on whether an energy of the input non-acoustic signal 208b is above a predetermined threshold. For example, the received non-acoustic signal 208b can be received over a period of several seconds, and the signal can be split into frames of, e.g., 20 ms. Each frame can have a corresponding energy signal output 222 as a high digital signal or a low digital signal, depending on whether the calculated energy value is higher than a predetermined threshold value or lower than a predetermined threshold value. When an average energy value over a frame duration is higher than the predetermined threshold, VAD signal 222 may be a high digital signal. By contrast, when the average energy value over the frame duration is lower than the predetermined threshold, VAD signal 222 may be a low digital signal. Accordingly, when accelerometer subsystem 506 is active, VAD 216 may output VAD signal 222 as a continuous series of high and low digital signals as a bit stream corresponding to frames of a given duration.

In an embodiment, ASR triggering system 100 includes a vibration probability unit (VPU) 516 to compute a probability measure that may be used as a gating signal for triggering speech recognition functions. VPU 516 may determine the probability measure based on a relationship between VAD signal 222 received from VAD 216 and one or more key-phrase flag signals received from acoustic detectors 210 and 502.

Acoustic detector 210 can output a partial key-phrase flag signal 518 when acoustic signal 206a matches a predetermined key-phrase portion. Partial key-phrase flag signal 518 may be the same as, or different than, power-on signal 504. For example, partial key-phrase flag signal 518 and power-on signal 504 may be simultaneously generated in response to a partial key-phrase utterance, however, partial key-phrase flag signal 518 may include information corresponding to a trigger time, e.g., a timestamp for the moment when the partial-key phrase utterance was completed. Accordingly, VPU 516 may determine, from partial key-phrase flag signal 518, a first time at which second acoustic detector 502 detected the partial key-phrase utterance.

VPU 516 may determine a time at which acoustic detector 210 detected a full key-phrase utterance. For example, acoustic detector 210 may generate full key-phrase flag signal 520 when acoustic signal 206a matches a predetermined key-phrase. Full key-phrase flag signal 520 may include information corresponding to a trigger time, e.g., a timestamp for the moment when the full key-phrase utterance was completed. Accordingly, VPU 516 may determine from full key-phrase flag signal 520 a second time at which acoustic detector 210 detected the full key-phrase utterance.

In an embodiment, VPU 516 can compute a number of frames of VAD signal 222 received between the generation (or receipt) of partial key-phrase flag signal 518 and full key-phrase flag signal 520. By way of example, when full key-phrase flag signal 520 is generated 1 second after partial key-phrase flag signal 518, and VAD 216 generates VAD signal 222 as a bit stream having frame durations of 20 ms, VPU 516 can compute that 50 frames of VAD signal data 222 are received between completion of the partial key-phrase utterance and the full key-phrase utterance.

VPU 516 may generate non-acoustic trigger signal 224 as a probability value based on the calculated frames received between partial key-phrase flag signal 518 and full key-phrase flag signal 520. The probability value may be referred to as a vibration probability value because it is a value defining a likelihood that the key-phrase utterance was made by the user wearing accelerometer 108. VPU 516 may compute the vibration probability value by dividing a number of frames of VAD signal 222 having high binary values between the partial key-phrase utterance and the full key-phrase utterance by a total number of frames between the partial key-phrase detection flag and the full key-phrase detection flag. Based on the above example, VPU 516 calculated that 50 total frames existed between flag signals 518 and 520. VPU 516 can detect a number of frames over that time that were high digital signals, i.e., when the VAD signal 222 value was high based on whether an energy of the input non-acoustic signal 208b was above the predetermined threshold. By way of example, VPU 516 may determine that 45 frames of VAD signal 222 received from VAD 216 between flag signals 518 and 520 were high binary output values. Based on this example, VPU 516 may calculate non-acoustic trigger signal 224 as a vibration probability value of 0.90, corresponding to a 90% likelihood that the utterance was made by the user. When the vibration probability value is close to 1.0, it is very likely that the user uttered the key-phrase, and not a bystander.

Processor 214 may receive acoustic trigger signal 212 from acoustic detector 210 and non-acoustic trigger signal 224 from VPU 516. Acoustic trigger signal 212 may be the same or different than full key-phrase flag signal 520. For example, the signals may be simultaneously generated but carry different information. In an embodiment, processor 214 generates ASR trigger signal 202 in response to the vibration probability value being above a predetermined threshold probability value. Processor 214 can determine, based on acoustic trigger signal 212, that a full key-phrase utterance has been detected. Processor 214 can compare non-acoustic trigger signal 224 to a predetermined threshold probability value. For example, processor 214 may determine that ASR trigger signal 202 is warranted when VPU 516 calculates that there is at least a 30% likelihood that the key-phrase utterance was made by the user. In the example above, processor 214 can determine that the calculated value of 0.90 is higher than the threshold value of 0.30, and thus, processor 214 may generate ASR trigger signal 202 in response to acoustic trigger signal 212 gated by non-acoustic trigger signal 224.

ASR triggering system 100 may gate payload 204. Payload 204 can be sent directly to ASR server 200 as described above, however, payload 204 may instead pass through processor 204 and be sent to ASR server 200 only when ASR trigger signal 202 is output. In an embodiment, ASR triggering system 100 includes an audio buffer 530 to buffer voice data generated by microphone 114. For example, acoustic data 206a may pass through audio buffer 530, which buffers several seconds, e.g., 2 seconds, of audio data and passes the audio data as payload 204 to processor 214. Processor 214 can pass payload 204 to ASR server 200 when the vibration probability value is higher than the predetermined threshold, i.e., when ASR trigger signal 202 is output. As described above, ASR server 200 may reside on mobile device 112 or be remotely located from the user.

It will be recognized that, in some instances, a partial key-phrase flag signal 518 may not be followed by a full key-phrase flag signal 520 within a predetermined amount of time. For example, the user may speak the partial key-phrase "Hey S" (a portion of the key-phrase "Hey Ski"), and follow the partial phrase by "teve" rather than "iri." The partial key-phrase utterance may cause second acoustic detector 502 to generate partial key-phrase flag signal 518, and the full utterance that does not match the full key-phrase may not cause acoustic detector 210 to generate full key-phrase flag signal 520. VPU 516 can receive flag signal 518 and not flag signal 520 within a predetermined time period, e.g., 1 second. When the predetermined time period has passed, if the flag signal 520 that is requisite to a determination of the vibration probability value is not received by VPU 516, accelerometer subsystem 506 may be deactivated and VPU 516 can be reset. Accordingly, power may be saved by discontinuing the determination or output of non-acoustic signal 224 when no key phrase signal is forthcoming.

Figure 6:
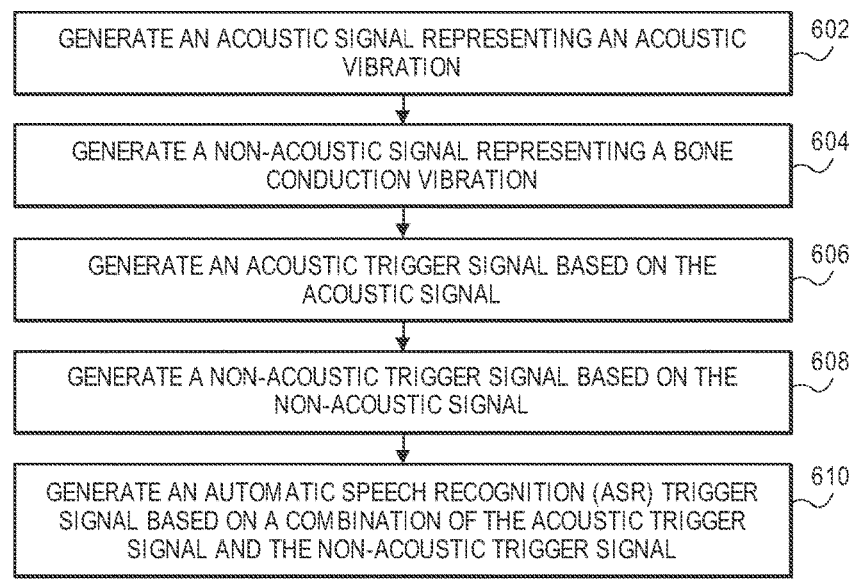
FIG. 6 is a flowchart of an ASR triggering method, in accordance with an embodiment.
Figure 7:
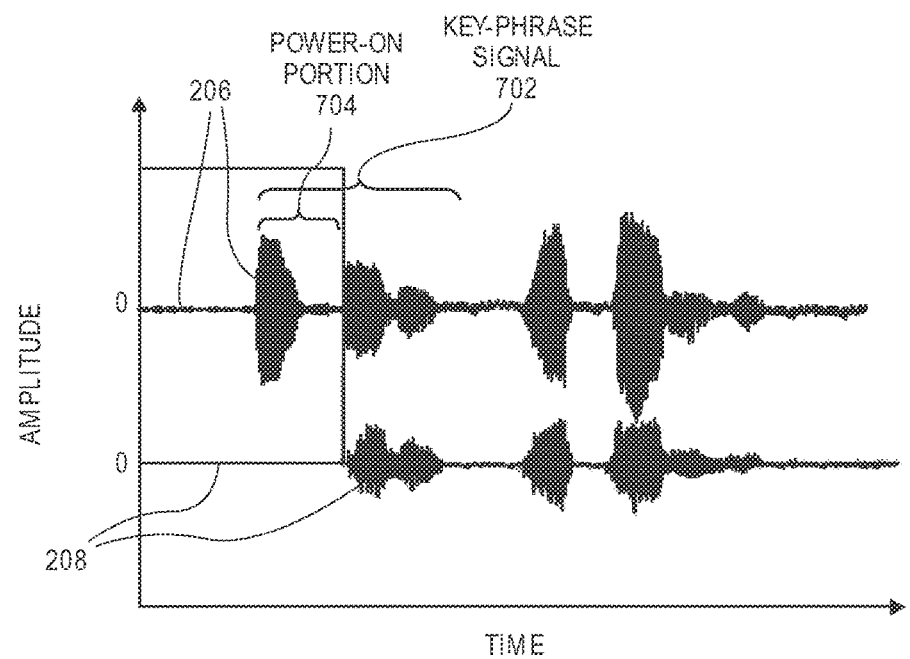
FIG. 7 is a visual representation of acoustic and non-acoustic signals representing acoustic and non-acoustic vibrations, in accordance with an embodiment.

Referring to FIG. 6, a flowchart of an ASR triggering method is shown in accordance with an embodiment. At operation 602, acoustic signal 206 is generated by microphone 114 representing acoustic vibration 116. At operation 604, non-acoustic signal 208 is generated by accelerometer 108 representing bone conduction vibration. Referring to FIG. 7, a visual representation of acoustic and non-acoustic signals is shown in accordance with an embodiment. The upper plot may represent a time domain signal of microphone 114. Acoustic signal 206 can have a waveform that varies when sound is received by microphone 114. For example, the bundles of energy peaks can occur when microphone 114 detects words spoken by user 106. Similarly, the lower plot may represent a time domain signal of accelerometer 108. Non-acoustic signal 208 can have a waveform that varies when bone conduction vibrations are received by accelerometer 108. For example, the bundles of energy peaks can occur when accelerometer 108 detects mechanical vibrations corresponding to words spoken by user 106.

At operation 606, acoustic trigger signal 212 is generated by acoustic detector 210 based on acoustic signal 206. Referring to FIG. 7, acoustic detector 210 can detect a partial or full key-phrase spoken by user 106. For example, acoustic detector 210 can detect a key-phrase portion 702 of the acoustic waveform. Key-phrase portion 702 can include the portion of the waveform that has a predetermined energy signature, i.e., the predetermined key-phrase signal. When acoustic detector 210 detects the predetermined key-phrase signal, acoustic trigger signal 212 can be sent to processor 214. Acoustic trigger signal 212 can be a binary output, e.g., a high digital signal.

Acoustic detector 210 (or second acoustic detector 502) can optionally detect a power-on portion 704 of the acoustic waveform. The power-on portion 704 can include the portion of the predetermined key-phrase signal that corresponds to, e.g., a first word or a first syllable of the full key-phrase. Detection of the power-on portion 704 can trigger the transmission of power-on signal 504 to accelerometer subsystem 506.

Figure 8:
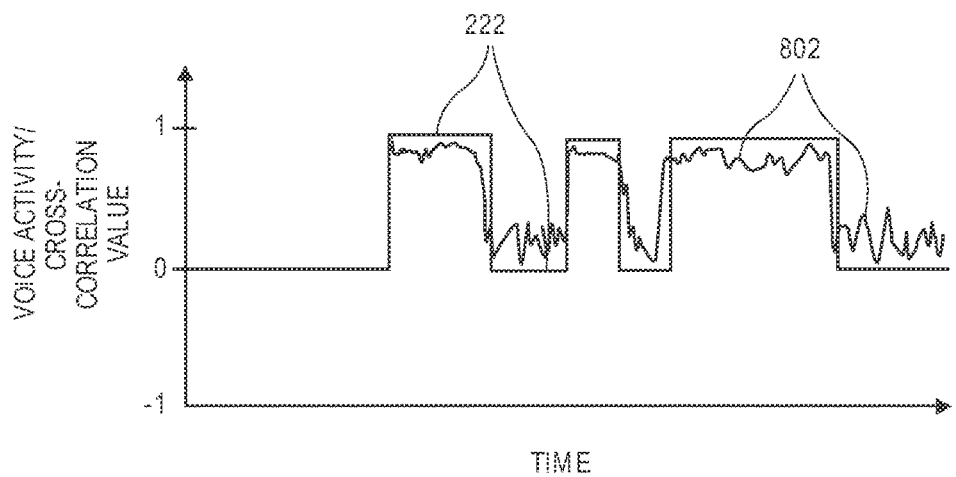
FIG. 8 is a visual representation of a voice activity signal based on a non-acoustic signal representing non-acoustic vibrations, in accordance with an embodiment.

At operation 608, the activated accelerometer subsystem 506 can generate a non-acoustic trigger signal 224 based on non-acoustic signal 208. Referring to FIG. 8, a visual representation of a VAD signal 222 based on non-acoustic signal 208 is shown in accordance with an embodiment. Voice activity values can be plotted against time. More particularly, voice activity values can represent an energy of an accelerometer axis signal above a given threshold, or a cross-correlation of several, e.g., two, accelerometer axis signals or a cross-correlation of microphone and accelerometer signals plotted against time. The cross-correlation values can be normalized between −1 and 1, representing direct and inverse correlations between the input signals.

In an embodiment, VAD signal 222 can be a high digital signal when cross-correlation values are above a predetermined value, and VAD signal 222 can be a low digital signal when cross-correlation values are below the predetermined value. As shown in FIG. 8 by way of example, VAD signal 222 is high when cross-correlation values 802 are above 0.45, and VAD signal 222 is low when cross-correlation values 802 are below 0.45. The high and low levels of VAD signal 222 can be passed directly to processor 214 or processed further, e.g., by detecting patterns in VAD signal 222 by pattern detector 226.

At operation 610, ASR trigger signal 202 is generated based on a combination of acoustic trigger signal 212 and non-acoustic trigger signal 224. Processor 214 receives acoustic trigger signal 212 from acoustic detector 210 and non-acoustic trigger signal 224 from VAD 216 and/or pattern detector 226. Processor 214 can perform logical functions on the received trigger signals. For example, processor 214 can compare the trigger signals to determine whether microphone and accelerometer signals are being simultaneously asserted. Processor 214 can generate ASR trigger signal 202 based on the combination to begin speech recognition at ASR server 200.

Figure 9:
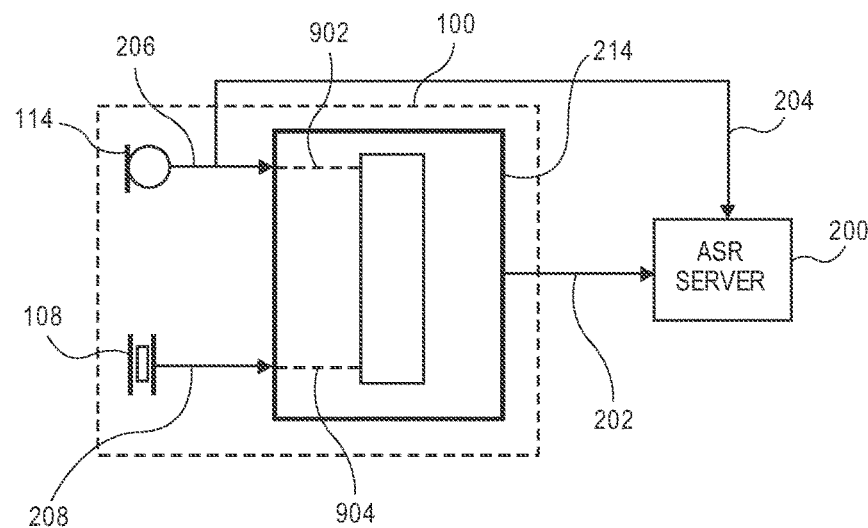
FIG. 9 is a block diagram of an ASR system having a multi-channel triggering processor, in accordance with an embodiment.

Referring to FIG. 9, a block diagram of an ASR triggering system having a multi-channel triggering processor is shown in accordance with an embodiment. ASR triggering system 100 may generate ASR trigger signal 202 based on an implicit combination of acoustic and non-acoustic signals within processor 214, rather than using explicit logical combinations as described above. In an embodiment, microphone 114 generates acoustic signal 206 representing acoustic vibration 116, and accelerometer 108 generates non-acoustic signal 208 representing bone conduction vibrations. ASR triggering system 100 may include processor 214 having several channels to receive acoustic signal 206 and non-acoustic signal 208 directly from microphone 114 and accelerometer 108. For example, processor 214 may include an acoustic channel 902 to receive acoustic signal 206, and a non-acoustic channel 904 to receive non-acoustic signal 208. Processor 214 may be a key-phrase detector to receive both input signals as raw signals and perform signal pattern detection on both signals.

In an embodiment, the multi-channel key-phrase detector (processor 214) can be trained to look for energy patterns within different energy bandwidths on each channel. Acoustic signal 206 may have a higher energy bandwidth than non-acoustic signal 208, and thus, the energy patterns on acoustic channel 902 can have a higher energy bandwidth than the energy patterns on non-acoustic channel 904. By way of example, accelerometer 108 may detect mechanical vibrations that generally have frequencies below 1 kHz due to damping by body tissue of user 106. By contrast, microphone 114 may detect acoustic vibrations 116 that generally have frequencies up to 10-15 kHz. Accordingly, non-acoustic signal 208 input to non-acoustic channel 904 may have an energy bandwidth less than 1 kHz, and acoustic signal 206 input to acoustic channel 902 may have an energy bandwidth more than 1 kHz.

Processor 214 may monitor both acoustic channel 902 and non-acoustic channel 904 to determine a coincidence of acoustic signal 206 and non-acoustic signal 208. In an embodiment, processor 214 may detect a predetermined key-phrase signal in both acoustic signal 206 and non-acoustic signal 208. Processor 214 can be trained using computational models, e.g., a neural network, to detect the spoken key-phrase in both signals. When the key-phrase is simultaneously detected in both signals, processor 214 can generate ASR trigger signal 202. That is, processor 214 can generate ASR trigger signal 202 when acoustic signal 206 matches non-acoustic signal 208. Processor 214 may determine that acoustic signal 206 matches non-acoustic signal 208 when acoustic signal 206 and non-acoustic signal 208 simultaneously match a predetermined key-phrase signal. ASR trigger signal 202 may be a binary output, as described above. Thus, processor 214 can combine acoustic signal 206 and non-acoustic signal 208 implicitly to trigger ASR server 200.

Figure 10:
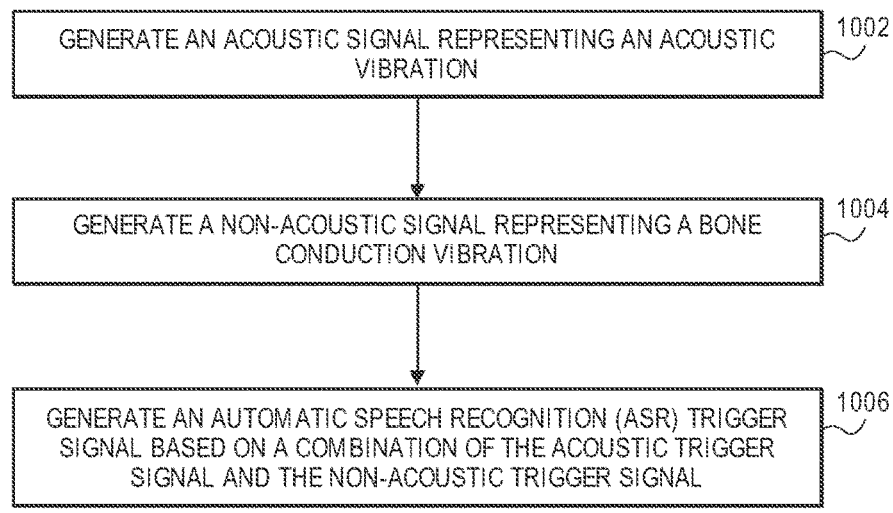
FIG. 10 is a flowchart of an ASR triggering method, in accordance with an embodiment.

Referring to FIG. 10, a flowchart of an ASR triggering method is shown in accordance with an embodiment. At operation 1002, acoustic signal 206 is generated representing acoustic vibration 116. Acoustic signal 206 can be input to acoustic channel 902 of processor 214, which can be a multi-channel key-phrase detector. At operation 612, non-acoustic signal 208 is generated representing bone conduction vibrations. Non-acoustic signal 208 can be input to non-acoustic channel 904 of the multi-channel key-phrase detector. At operation 1006, ASR trigger signal 202 is generated based on a combination and/or comparison of acoustic trigger signal 212 and non-acoustic trigger signal 224. The trigger signals may be compared to each other, or compared to a predetermined key-phrase signal, to detect a coincidence of the key-phrase vibrations detected acoustically and non-acoustically. When the simultaneous assertion of the key-phrase by microphone 114 and accelerometer 108 is detected, ASR trigger signal 202 can be generated and sent to initiate speech recognition of payload 204 at ASR server 200.

In an embodiment, a specific non-acoustic pattern, e.g., a pattern of non-acoustic vibrations 110 from spoken phonemes or hums, is automatically detected and used to trigger the primary ASR system. For example, the accelerometer 108 signal may be monitored to determine a presence of a predetermined hum pattern, e.g., short-hum, short-hum, long-hum. Similarly, the accelerometer signal may be monitored to determine a presence of a predetermined utterance pattern, e.g., the syllables 'ti-ti-ta' or the words "sixty five." The accelerometer signal may be cross-correlated as described above. When the predetermined hum or utterance pattern is detected, the primary ASR system may be triggered to initiate speech recognition on a payload of voice data.

Figure 11:
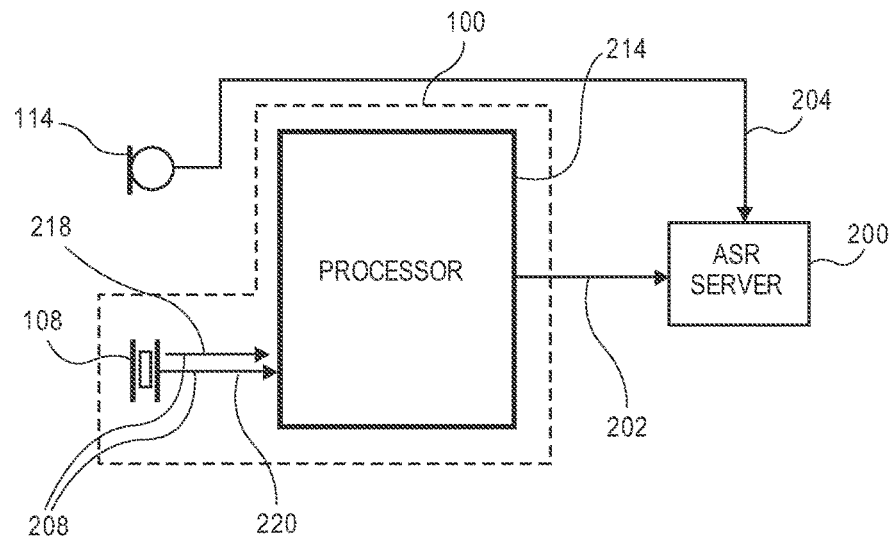
FIG. 11 is a block diagram of an ASR system having a processor to generate an ASR trigger signal based on non-acoustic signals, in accordance with an embodiment.

Referring to FIG. 11, a block diagram of an ASR triggering system having a processor to generate an ASR trigger signal based on non-acoustic signals is shown in accordance with an embodiment. ASR triggering system 100 can include accelerometer 108. Accelerometer 108 can generate non-acoustic signal 208 representing physical vibrations along at least one axis. For example, non-acoustic signal 208 may include first axis signal 218 and second axis signal 220, as described above. In an embodiment, non-acoustic signal 208 corresponds to an input command pattern made by user 106. More particularly, when user 106 makes a hum, vibrations from the humming resonate through the skull of the user 106. The vibrations, i.e., bone conduction vibrations, may be thus transmitted from the vocal cords of user 106 to ear canal 104, and through an ear canal 104 wall, to the earphone housing and accelerometer 108. Hum may be distinguished from a verbal sound, i.e., normal speech, of user 106. For example, hum may include a wordless tone generated by vibrations of the vocal cords. More particularly, the wordless tone may be a sound forced to emerge from the nose of user 106. As described below, such sounds differ from verbal sounds at least in part because hum is monotone or includes slightly varying tones. Therefore, humming may be less susceptible to distortion by ambient noise or differences in user vocalization as compared to verbal sounds because the sensed vibrations are transmitted directly through tissue of the user 106.

ASR triggering system 100 may include processor 214 to receive non-acoustic signal 208 and to generate ASR trigger signal 202 based on non-acoustic signal 208. For example, processor 214 may compare non-acoustic signal 208 to a predetermined sequence of energy intervals. The comparison may rely on a direct comparison of energy levels, and thus, ASR triggering system 100 may not include a key-phrase detector. Rather, ASR triggering system 100 may detect a specific hum pattern on the accelerometer channel(s) that match a predetermined hum pattern used as a trigger command.

In an embodiment, processor 214 cross-correlates accelerometer data and compares the cross-correlation value to the predetermined sequence of energy intervals. When the non-acoustic signal 208 matches the predetermined sequence of energy intervals, processor 214 can generate ASR trigger signal 202 to start speech recognition at ASR server 200. Speech recognition may be performed on payload 204 received directly from microphone 114 at ASR server 200. That is, microphone 114 may generate voice data that is processed by ASR server 200 in response to a trigger generated based on non-voice data.

Figure 12:
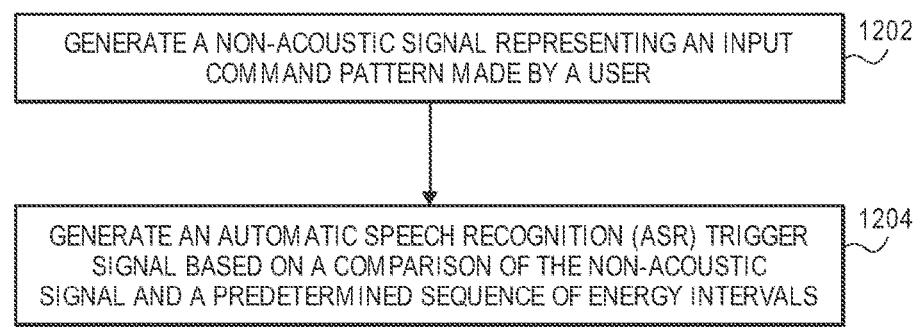
FIG. 12 is a flowchart of an ASR triggering method, in accordance with an embodiment.

Referring to FIG. 12, a flowchart of an ASR triggering method is shown in accordance with an embodiment. At operation 1202, non-acoustic signal 208 representing an input command pattern made by a user, e.g., a sequence of hums, is generated. The sequence of hums can be a hum pattern, i.e., a pattern of two or more hums. In an embodiment, the hum pattern includes at least one hum of a predetermined duration, e.g., one long hum. The more complex the hum pattern, i.e., the more discrete hums in the pattern, the more robust the input command pattern may be, and the less likely it is that ASR triggering system 100 will generate a false trigger.

Figure 13:
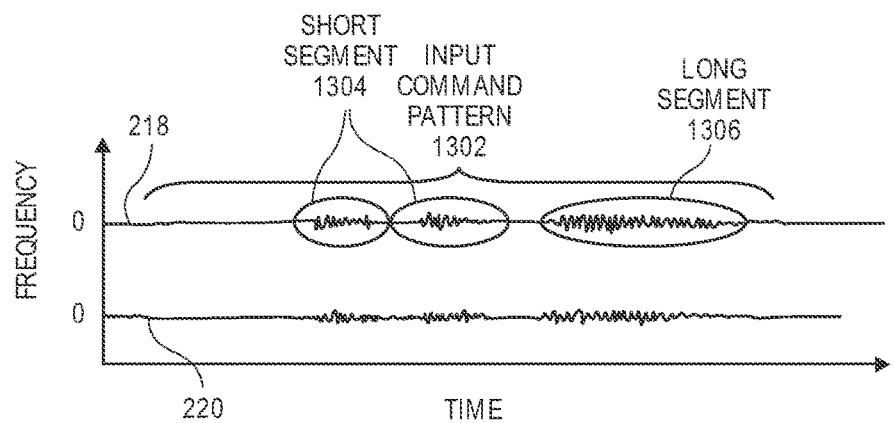
FIG. 13 is a visual representation of a non-acoustic signal representing an input command pattern made by a user, in accordance with an embodiment.

Referring to FIG. 13, a visual representation of a non-acoustic signal representing an input command pattern made by a user is shown in accordance with an embodiment. Non-acoustic signal 208 can include an input command pattern 1302 containing one or more hums represented by a spectrogram, which includes the respective fundamental frequencies of each hum plotted against time. The spectra of fundamental vocal cord vibration for humming is usually above about 80 Hz for males, above 160 Hz for females, and even higher for children. That is, a predominant fundamental tone of each hum may have strong harmonics up to about 1 kHz in the accelerometer signal from ear canal 104. Accordingly, ASR triggering system 100 may detect input signals from accelerometer 108 corresponding to bone conducted vibrations having frequencies less than 1 kHz. Such a detection cutoff may provide good detectability for humming, however, the cutoff may be too low to detect the full range of vibrations inherent in a voice. For example, harmonics having frequencies above 1 kHz may be common for a voice. Accordingly, non-verbal input commands from user 106 may be effectively detected by ASR triggering system 100 using less signal processing bandwidth than may be required for acoustic voice detection.

Notably, the spectrogram of accelerometer signals corresponding to humming may also differ from the spectrogram of accelerometer signals corresponding to speech in that each hum may have a respective frequency that remains constant over a duration of the hum. More particularly, whereas each word of a voice includes phonemes having different predominant frequencies that change over an entire duration of the word, each hum may have a respective tone with a predominant frequency that remains more constant over the entire duration of the hum.

Still referring to FIG. 13, input command pattern 1302 by user 106 may be detected by accelerometer 108 and input to processor 214 as first axis signal 218 and second axis signal 220. First axis signal 218 can include an input command pattern 1302 having different segments corresponding to individual hums in the pattern. For example, input command pattern 1302 may include one or more short segments 1304 corresponding to short hums (two in the illustrated case) and one or more long segments 1306 corresponding to long hums (one in the illustrated case). In an embodiment, the respective durations of each hum may be determined by comparison. For example, long segments 1306 of long hums may be longer than short segments 1304 of short hums. Alternatively, the different durations may be determined with respect to a predetermined threshold. For example, any hum having a duration longer than a predetermined duration may be considered to be a long hum, and any hum having a duration shorter than the predetermined duration may be considered to be a short hum. Thus, the length of a constant tone to trigger a recognition of an input command segment may be customized. For example, a respective duration of all short segments 1304 may be in a range of 100-400 milliseconds, and a respective duration of all long hums segments may be in a range greater than 400 milliseconds.

Figure 14:
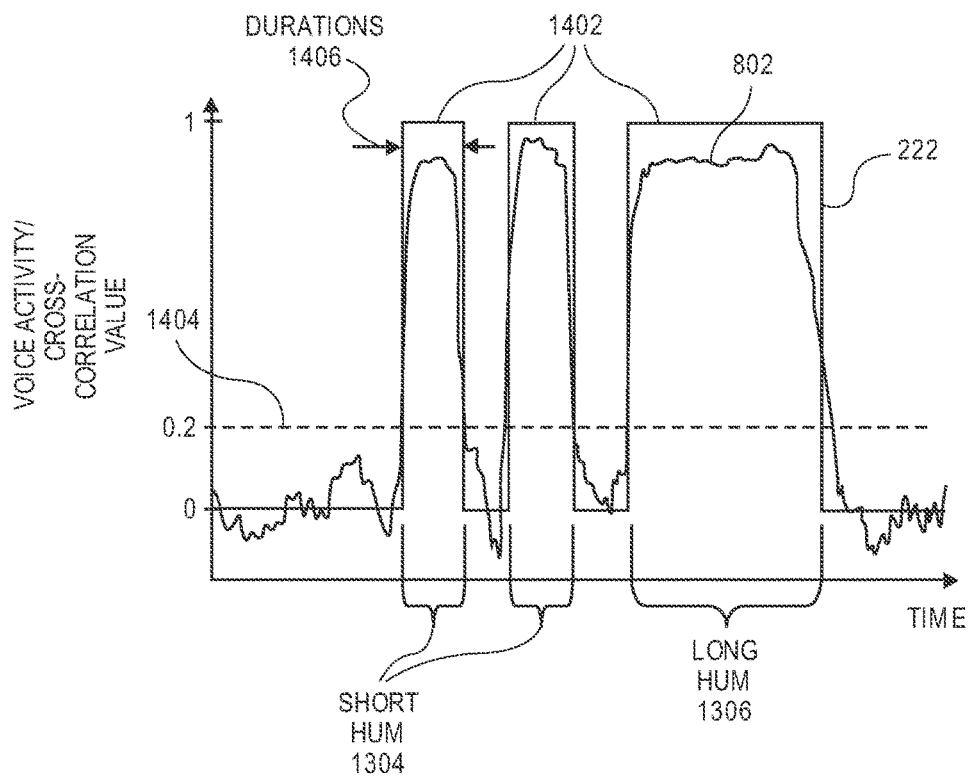
FIG. 14 is a visual representation of a voice activity signal based on a non-acoustic signal representing several segments of an input command pattern, in accordance with an embodiment.

Referring to FIG. 14, a visual representation of a voice activity signal based on a non-acoustic signal representing an input command pattern is shown in accordance with an embodiment. The bone conduction vibrations detected along the first axis and the second axis of accelerometer 108 may coincide, as shown in FIG. 13. Accordingly, the axial signals can be closely correlated, and cross-correlation values may be equal to, or nearly equal to, 1 over short segments 1304 and long segments 1306 of input command pattern 1302. The VAD signal 222 can therefore include a sequence of energy peaks 1402 that coincide with moments when user 106 is humming. In an embodiment, cross-correlation values 802 are smoothed by an exponential smoother and passed through a fixed threshold to generate the hum detector signal. For example, predetermined correlation threshold 1404 may be 0.2, and a high digital signal can be generated over a duration 1406 of an energy peak when cross-correlation values 802 are higher than predetermined cross-correlation threshold 1404. VAD signal 222 may therefore have sequence of energy peaks 1402 corresponding to moments when the cross-correlation values 802 are above a predetermined correlation threshold 1404. A detected hum using accelerometer data is similar to detecting voice activity based on energy, but the cross-correlation can be more robust because it does not depend on an amplitude of accelerometer signals that vary from user to user. That is, cross-correlation can detect high and low energy peaks in accelerometer data regardless of an amplitude of first axis signal 218 and second axis signal 220.

Duration 1406 of energy peak may correspond to a duration of a hum in input command pattern 1302. For example, when user 106 begins humming, the cross-correlated accelerometer signal may rise above predetermined power threshold marking an onset of an energy peak, and when user 106 stops humming, the cross-correlated accelerometer signal may fall below predetermined power threshold marking an end of the energy peak.

At operation 1204, processor 214 may generate ASR trigger signal 202 based on a comparison of non-acoustic signal 222 and a predetermined sequence of energy intervals. Processor 214 can determine the sequence of energy peaks 1402 of non-acoustic signal 208 corresponding to the segments of input command pattern 1302. Processor 214 may be trained with a predetermined sequence of energy intervals. Processor 214 may be trained during setup of mobile device 112 to recognize a sequence of long pause, short hum, short pause, short hum, short pause, long hum, and long pause (by way of example only) as a trigger command to begin speech recognition. This predetermined sequence is matched by the accelerometer data, i.e., the VAD signal 222, shown in FIG. 14. Accordingly, processor 214 can compare the sequence of energy peaks 1402 to the predetermined sequence of energy intervals to determine that the patterns match. In response to determining that sequence of energy peaks 1402 matches the predetermined sequence of energy intervals, processor 214 may generate ASR trigger signal 202.

Figure 15:
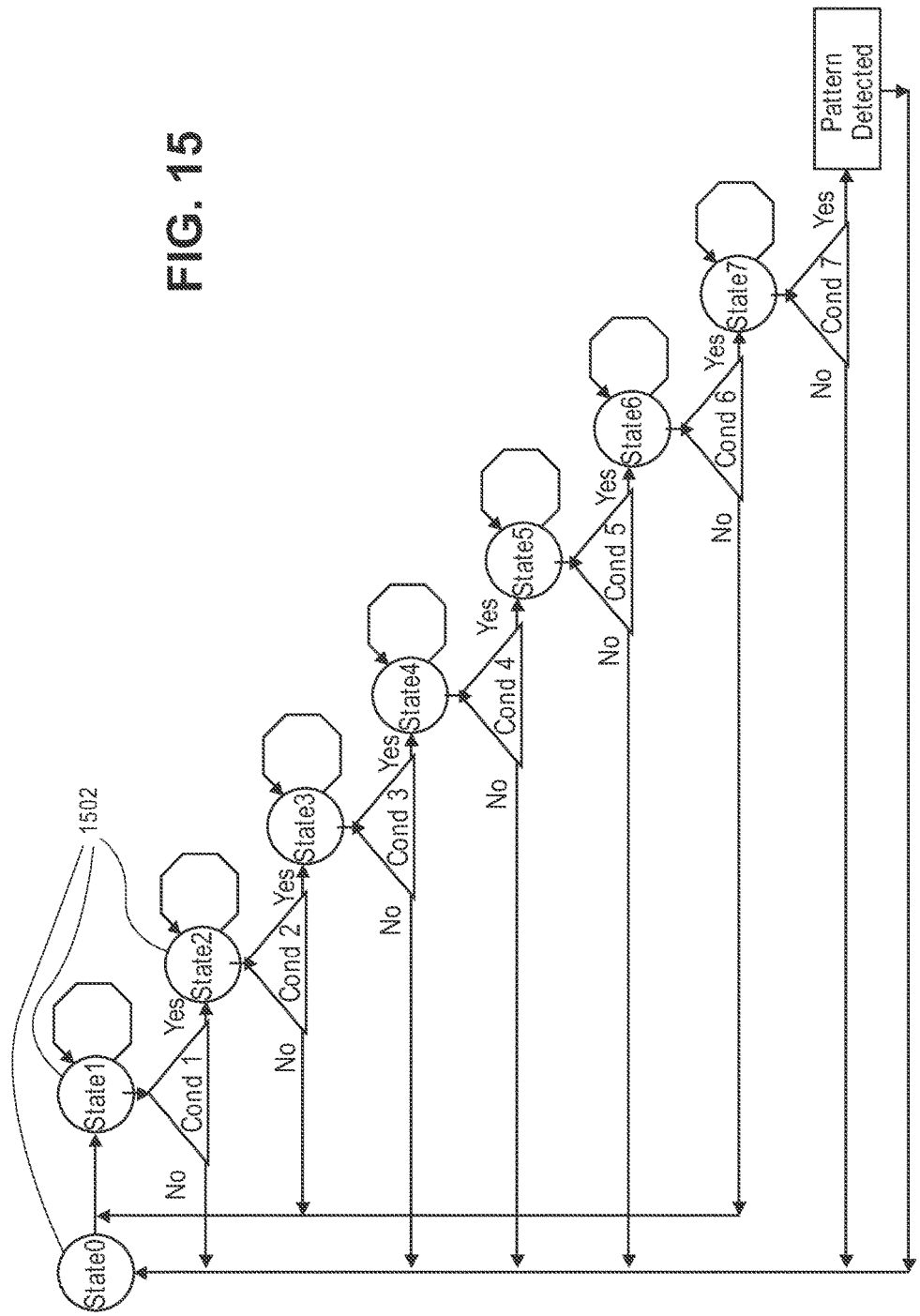
FIG. 15 is a flowchart of a state machine algorithm having several states corresponding to predetermined segments of an input command pattern, in accordance with an embodiment.

Referring to FIG. 15, a flowchart of a state machine algorithm having several states corresponding to predetermined segments of an input command pattern is shown in accordance with an embodiment. Processor 214 can act as a state machine to determine whether the input command pattern 1302 made by user 106 matches a predetermined input command pattern. Each energy interval in the predetermined sequence of energy intervals may correspond to a unique state 1502. That is, the predetermined sequence of energy intervals may include several states 1502 corresponding to a respective segment of input command pattern 1302. In an embodiment, input command pattern 1302 includes a predetermined sequence of hums and pauses, and thus, the states 1502 correspond to respective hums or pauses in the sequence. Processor 214 may follow a simple heuristic, e.g., an if-then algorithm, to determine whether a received command from user 106 matches a pre-trained trigger command, and thus, triggers speech recognition. For example, as processor 214 identifies each sequential hum or pause in a predetermined sequence, a condition is met to advance from a previous state to a next state. In the illustrated example, seven states corresponding to hums and pauses of different lengths exist between an initial state and a final state when the input command pattern is detected.

Figure 16:
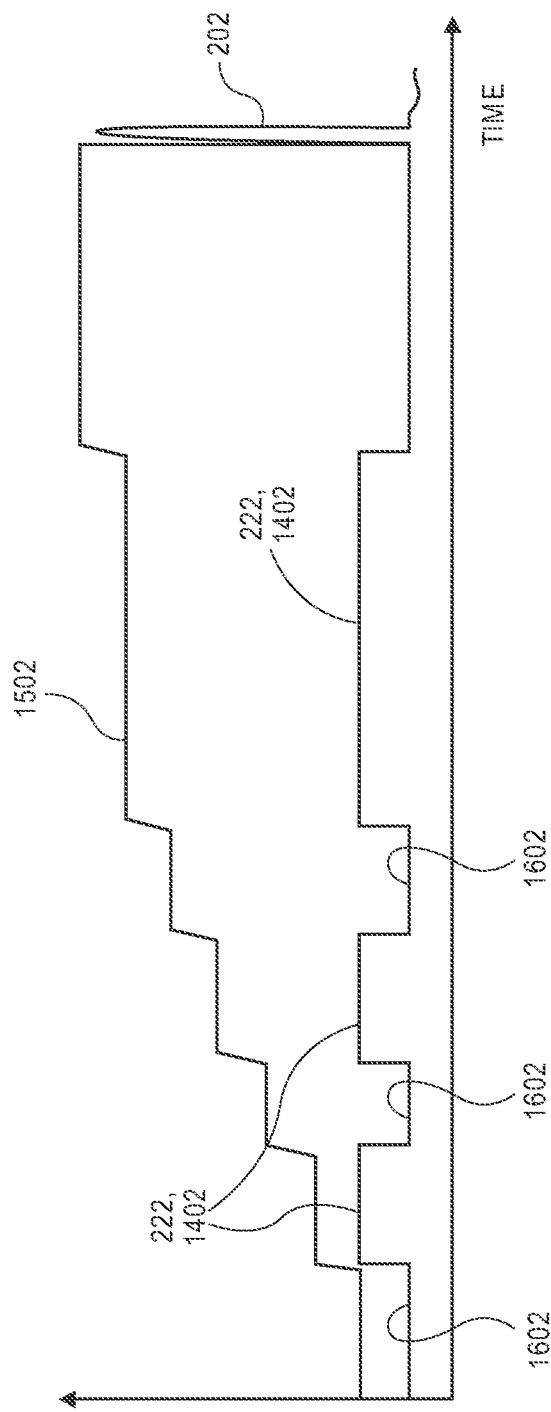
FIG. 16 is a visual representation of a voice activity signal based on a non-acoustic signal representing an input command pattern, and corresponding states, in accordance with an embodiment.

Referring to FIG. 16, a visual representation of a voice activity signal based on a non-acoustic signal representing an input command pattern, and corresponding states, is shown in accordance with an embodiment. VAD signal 222 includes sequence of energy peaks 1402 corresponding to respective energy intervals in a predetermined sequence, and energy troughs 1602 corresponding to respective energy intervals. Energy troughs 1602 may be during moments when an energy of a single-axis voice activity signal or a cross-correlation signal is below a predetermined threshold, e.g., predetermined correlation threshold 1404. For example, energy troughs may occur during a pause in humming or speech by user 106. As each energy interval matches the predetermined energy interval in the trained trigger command, the state machine may progress through a sequence of states 1502. In an embodiment, as depicted in FIG. 15, when the VAD signal 222 fails to meet a condition to advance to a next state 1502, the state machine can revert to an initial state. ASR triggering system 100 may then reset to begin monitoring user inputs for the input command pattern 1302 again. When the state machine reaches a final state 1502, processor 214 may assert ASR trigger signal 202. That is, when input command pattern 1302 is detected, the input command pattern 1302 acts as a trigger to start speech recognition at ASR server 200.

In an embodiment, input command pattern 1302 includes a predetermined sequence of phonemes spoken by user 106, e.g., during a key-phrase. Thus, the states 1502 may correspond to respective phonemes or pauses in the sequence. For example, input command pattern 1302 may be a phrase or series of phonemes such as in the word "sixty-two" that can be broken into the syllables "six-ty-two." Each syllable, and the pauses between syllables, may have a predetermined duration. The predetermined durations may be learned during training by user 106, and thus, the trained sequence of energy intervals may be personalized to user 106. Processor 214 may monitor the accelerometer signal for voice activity that corresponds to the pre-trained sequence of phonemes to identify progression to a final state that triggers ASR server 200.

Figure 17:
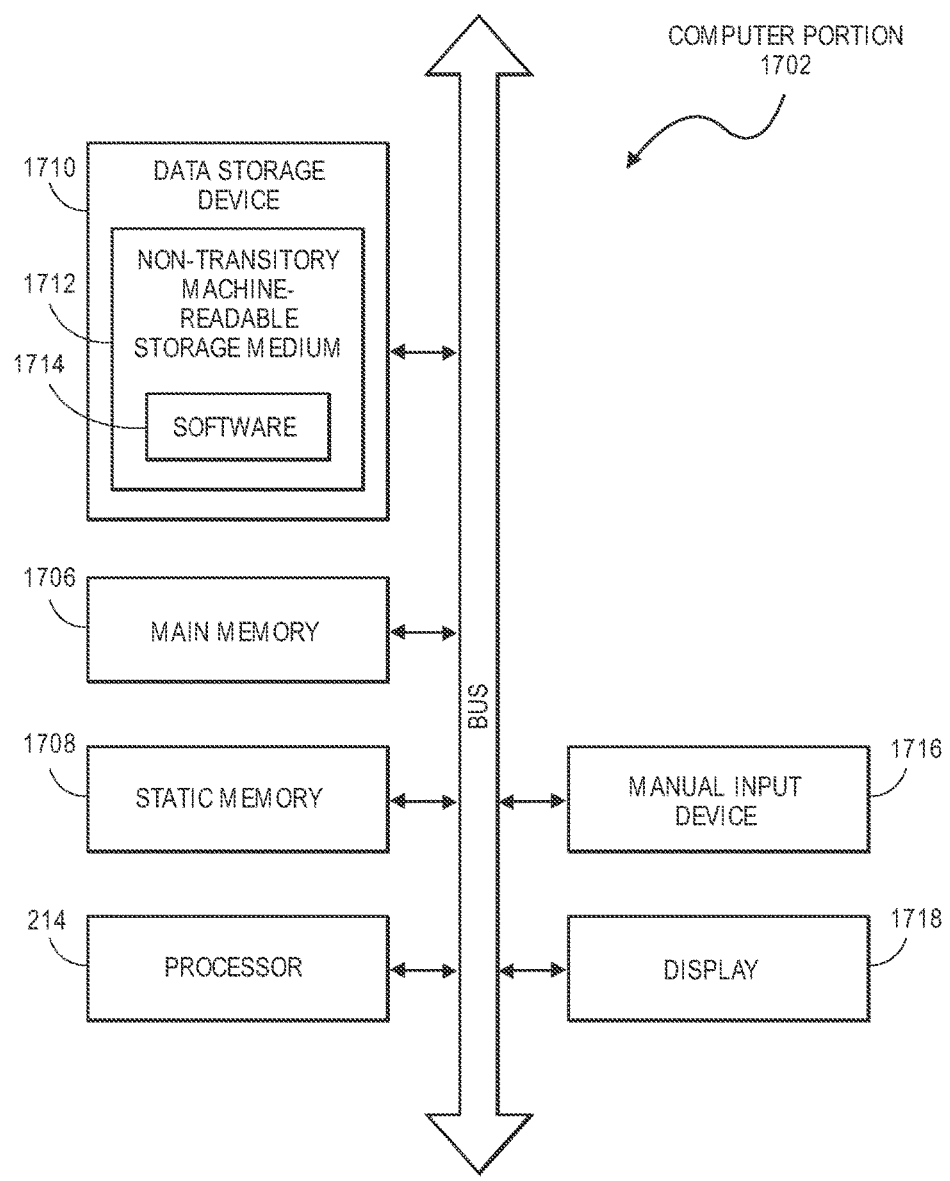
FIG. 17 is a block diagram of a computer portion of an automatic triggering system, in accordance with an embodiment.

Referring to FIG. 17, a block diagram of a computer portion of ASR triggering system is shown in accordance with an embodiment. Computer portion may have a processing system that includes the illustrated system architecture. Computer portion can reside on mobile device 112 or in a headset. Computer portion 1702 can include the circuitry of ASR training system 100. Certain standard and well-known components which are not germane to the present invention are not shown. Processing system may include an address/data bus 1704 for communicating information, and one or more processors 214 coupled to bus for processing information and instructions. More particularly, processor 214 may be configured to receive input signals from accelerometer 108 and microphone 114, execute an ASR triggering module, e.g., including a state machine algorithm, and provide ASR trigger signal 202, as described above.

Processing system may also include data storage features such as a memory storing the ASR triggering module executable by processor(s) 214. Memory may include a main memory 1706 having computer usable volatile memory, e.g., random access memory (RAM), coupled to bus 1704 for storing information and instructions for processor(s) 214, a static memory 1708 having computer usable non-volatile memory, e.g., read only memory (ROM), coupled to bus for storing static information and instructions for the processor(s) 214, or a data storage device 1710 (e.g., a magnetic or optical disk and disk drive) coupled to bus 1704 for storing information and instructions. Data storage device 1710 may include a non-transitory machine-readable storage medium 1712 storing one or more sets of instructions executable by processor(s) 214. For example, the instructions may be software 1714 including software applications, such as the state machine. Software 1714 may reside, completely or at least partially, within main memory 1706, static memory 1708, and/or within processor(s) 214 during execution thereof by processing system 1702. More particularly, main memory 1706, static memory 1708, and processor(s) 214 may also constitute non-transitory machine-readable storage media.

ASR triggering system 100 of the present embodiment includes input devices for receiving active or passive input from a user 106. For example, manual input device 1716 may include alphanumeric and function keys coupled to bus 1704 for communicating information and command selections to processor(s) 214. Manual input device 1716 may include input devices of various types, including a keyboard device, a touchscreen devices, or a touchpad. Manual input device 1716 may include accelerometer 108 and/or microphone 114 integrated in a headset, or a voice activation input device, to name a few types. Input signals from manual input device 1716 may be communicated to bus 1704 through wired and/or wireless connections. Display 1718 of ASR triggering system 100 may be coupled to bus 1704 for displaying a graphical user interface to user 106, e.g., during setup of mobile device 112 and/or training of input command patterns 1302 by user.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. An automatic speech recognition (ASR) triggering system, comprising:
    a microphone to generate an acoustic signal representing an acoustic vibration;
    an accelerometer to generate a non-acoustic signal representing a bone conduction vibration;
    an acoustic detector to receive the acoustic signal and to generate an acoustic trigger signal in response to the acoustic signal matching an energy signature of a key-phrase;
    a voice activity detector (VAD) to receive the non-acoustic signal and to generate a VAD signal based on the non-acoustic signal;
    a pattern detector to receive the VAD signal and to generate a non-acoustic trigger signal in response to the VAD signal matching a predetermined sequence of energy intervals of the key phrase; and
    a processor to receive the acoustic trigger signal and the non-acoustic trigger signal, and generate an ASR trigger signal based on a combination of the acoustic trigger signal and the non-acoustic trigger signal when the acoustic trigger signal and the non-acoustic trigger signal are asserted.

2. The ASR triggering system of claim 1, wherein the accelerometer detects the bone conduction vibration along one or more axes, wherein the non-acoustic signal includes one or more axis signals, and wherein the VAD generates the VAD signal based on an energy in the one or more axis signals.

3. The ASR triggering system of claim 2, wherein the one or more axis signals includes a first axis signal and a second axis signal, and wherein the VAD generates the VAD signal based on a cross-correlation of the first axis signal and the second axis signal.

4. The ASR triggering system of claim 1, wherein the VAD receives the acoustic signal, and wherein the VAD cross-correlates the acoustic signal and the non-acoustic signal to generate the VAD signal.

5. The ASR triggering system of claim 1, wherein the pattern detector detects a match between the VAD signal and the predetermined sequence of energy intervals, and generates the non-acoustic trigger signal in response to the match.

6. The ASR triggering system of claim 1, wherein the acoustic detector generates the acoustic trigger signal as a high digital signal, and wherein the VAD generates the VAD signal as the high digital signal when an energy or a cross-correlation value of the non-acoustic signal is above a predetermined threshold.

7. The ASR triggering system of claim 6, wherein the processor generates the ASR trigger signal when the acoustic trigger signal and the non-acoustic trigger signal are simultaneously high digital signals.

8. The ASR triggering system of claim 1 further comprising a second acoustic detector to receive the acoustic signal and to generate a power-on signal in response to detecting a power-on portion of the energy signature of the key-phrase, and wherein the accelerometer powers on and generates the non-acoustic signal in response to receiving the power-on signal from the second acoustic detector.

9. The ASR triggering system of claim 1, wherein the VAD receives the acoustic signal to generate the VAD signal based on the acoustic signal and the non-acoustic signal.

10. An automatic speech recognition (ASR) triggering system, comprising:
a microphone to generate an acoustic signal representing an acoustic vibration corresponding to user vocalizations, wherein the user vocalizations include a key-phrase and one or more additional vocalizations other than the key-phrase;
an accelerometer to generate a non-acoustic signal representing a bone conduction vibration corresponding to the user vocalizations; and
a processor including an acoustic channel to receive the acoustic signal and a non-acoustic channel to receive the non-acoustic signal, wherein the processor generates an ASR trigger signal based on a combination of the acoustic signal and the non-acoustic signal, and wherein the processor generates the ASR trigger signal to trigger speech recognition functions on the one or more additional vocalizations other than the key-phrase at least in response to the acoustic signal and the non-acoustic signal match a sequence of energy intervals of the key-phrase.

11. The ASR triggering system of claim 10, wherein the processor generates the ASR trigger signal when the acoustic signal matches the non-acoustic signal.

12. The ASR triggering system of claim 11, wherein the acoustic signal matches the non-acoustic signal when the acoustic signal and the non-acoustic signal simultaneously match the sequence of energy intervals of the key-phrase.

13. The ASR triggering system of claim 10, wherein the acoustic signal has a higher energy bandwidth than the non-acoustic signal.

14. The ASR triggering system of claim 10, wherein the ASR trigger signal is a binary output.

15. An automatic speech recognition (ASR) triggering system, comprising:
a microphone to generate an acoustic signal corresponding to user vocalizations, wherein the user vocalizations include a sequence of hums and one or more additional vocalizations other than the sequence of hums;
an accelerometer to generate a non-acoustic signal corresponding to the sequence of hums made by a user, wherein the sequence of hums have respective durations; and
a processor to
receive the non-acoustic signal, and
generate an ASR trigger signal based on a comparison of the respective durations of the sequence of hums to a selected sequence of durations of a hum pattern, wherein the ASR trigger signal is generated by the processor to trigger speech recognition functions on the one or more additional vocalizations other than the sequence of hums at least in response to the respective durations match the selected sequence of durations.

16. The ASR triggering system of claim 15, wherein the processor
determines a sequence of energy peaks of the non-acoustic signal corresponding to the sequence of hums,
compares the sequence of energy peaks to a selected sequence of energy intervals having the selected sequence of durations, and
generates the ASR trigger signal in response to determining the sequence of energy peaks matches the selected sequence of energy intervals.

17. The ASR triggering system of claim 16, wherein the accelerometer detects a bone conduction vibration along a first axis and along a second axis, wherein the non-acoustic signal includes a first axis signal corresponding to the bone conduction vibration along the first axis and a second axis signal corresponding to the bone conduction vibration along the second axis, and wherein the processor cross-correlates the first axis signal and the second axis signal to generate a VAD signal having the sequence of energy peaks.

18. The ASR triggering system of claim 17, wherein the processor determines an energy peak of the energy peaks when a cross-correlation value of the first axis signal and the second axis signal is above a selected correlation threshold.

19. The ASR triggering system of claim 18, wherein each respective duration of the sequence of hums is between when the cross-correlation value rises above the selected correlation threshold to when the cross-correlation value falls below the selected correlation threshold.

* * * * *